(12) United States Patent
Newcombe et al.

(10) Patent No.: US 8,266,122 B1
(45) Date of Patent: Sep. 11, 2012

(54) SYSTEM AND METHOD FOR VERSIONING DATA IN A DISTRIBUTED DATA STORE

(75) Inventors: Christopher R. Newcombe, Kirkland, WA (US); Florian W. Waas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 750 days.

(21) Appl. No.: 11/960,055

(22) Filed: Dec. 19, 2007

(51) Int. Cl.
G06F 7/06 (2006.01)
(52) U.S. Cl. .................. 707/695; 707/802; 707/705
(58) Field of Classification Search ........... 707/999.005, 707/999.203, 695, 802, 705
See application file for complete search history.

(56) References Cited

U.S. PATENT DOCUMENTS

| | | | | |
|---|---|---|---|---|
| 5,649,200 A * | 7/1997 | Leblang et al. | ............... | 717/122 |
| 5,805,889 A * | 9/1998 | Van De Vanter | ............... | 717/107 |
| 5,893,117 A * | 4/1999 | Wang | ............... | 1/1 |
| 5,983,241 A * | 11/1999 | Hoshino | ............... | 1/1 |
| 6,058,416 A * | 5/2000 | Mukherjee et al. | ........... | 709/203 |
| 6,195,685 B1 * | 2/2001 | Mukherjee et al. | ........... | 709/205 |
| 6,393,437 B1 * | 5/2002 | Zinda et al. | ............... | 717/124 |
| 6,453,324 B1 * | 9/2002 | Baisley et al. | ............... | 1/1 |
| 6,460,052 B1 * | 10/2002 | Thomas et al. | ............... | 707/695 |
| 6,785,696 B2 | 8/2004 | Mosher, Jr. | | |
| 6,892,210 B1 | 5/2005 | Erickson et al. | | |
| 7,072,911 B1 | 7/2006 | Doman et al. | | |
| 7,299,285 B2 | 11/2007 | Kasper, II | | |
| 7,392,234 B2 * | 6/2008 | Shaath et al. | ............... | 1/1 |
| 7,664,766 B2 * | 2/2010 | Factor et al. | ........... | 707/999.101 |
| 2003/0115179 A1 * | 6/2003 | Prabakaran et al. | ............... | 707/1 |
| 2003/0200235 A1 * | 10/2003 | Choy et al. | ............... | 707/203 |
| 2004/0073581 A1 * | 4/2004 | McVoy et al. | ............... | 707/203 |
| 2004/0230624 A1 * | 11/2004 | Frolund et al. | ............... | 707/204 |
| 2005/0091270 A1 * | 4/2005 | Beilinson et al. | ......... | 707/103 Y |
| 2005/0091291 A1 * | 4/2005 | Kaler et al. | ............... | 707/203 |
| 2005/0203969 A1 * | 9/2005 | Kawabe | ............... | 707/203 |
| 2005/0246389 A1 * | 11/2005 | Shah et al. | ............... | 707/200 |
| 2005/0283641 A1 * | 12/2005 | Clark et al. | ............... | 714/4 |
| 2006/0023969 A1 * | 2/2006 | Lara et al. | ............... | 382/309 |
| 2006/0106879 A1 * | 5/2006 | Zondervan et al. | ............ | 707/200 |
| 2006/0136511 A1 * | 6/2006 | Ngo et al. | ............... | 707/203 |
| 2006/0136513 A1 * | 6/2006 | Ngo et al. | ............... | 707/203 |
| 2006/0156253 A1 * | 7/2006 | Schreiber et al. | ............. | 715/835 |
| 2006/0206540 A1 * | 9/2006 | Lehner | ............... | 707/203 |
| 2006/0288053 A1 * | 12/2006 | Holt et al. | ............... | 707/203 |
| 2006/0288055 A1 * | 12/2006 | Johnson et al. | ............... | 707/203 |
| 2006/0291459 A1 | 12/2006 | Bain | | |
| 2007/0067373 A1 * | 3/2007 | Higgins et al. | ............... | 707/206 |

(Continued)

*Primary Examiner* — Phuong Thao Cao
(74) *Attorney, Agent, or Firm* — Robert C. Kowert; Meyertons, Hood, Kivlin, Kowert & Goetzel, P.C.

(57) ABSTRACT

A system and method for versioning of atomic units of data (such as XML fragments) in a distributed data store are disclosed. The distributed data store may maintain a linear version history for each fragment, such that each has no more than one successor and one predecessor, with no implicit branching. An application programming interface may provide an explicit branching request (indicating an intent to merge modified data in a child branch into its parent branch), along with read, create, create-merge, and/or integrate requests. A reconciliation policy may be specified on a per-application basis, and may include automatic reconciliation using a callback function or interactive reconciliation, with inputs returned to the application. Writes to a minority side of a network partition may be refused unless an explicit branch is requested. Transactions may not be supported in client applications or may be supported through explicit branching. Transactions may be used internally.

25 Claims, 10 Drawing Sheets

U.S. PATENT DOCUMENTS

| | | |
|---|---|---|
| 2007/0106683 A1 | 5/2007 | Grabelsky et al. |
| 2007/0124453 A1* | 5/2007 | Slaughter et al. ............. 709/223 |
| 2007/0143744 A1* | 6/2007 | Clemm et al. ................. 717/128 |
| 2007/0143752 A1* | 6/2007 | Clemm et al. ................. 717/178 |
| 2007/0162441 A1* | 7/2007 | Idicula et al. ..................... 707/5 |
| 2007/0208790 A1 | 9/2007 | Reuter et al. |
| 2007/0239797 A1* | 10/2007 | Cattell et al. .................. 707/201 |
| 2008/0072217 A1* | 3/2008 | Li et al. ......................... 717/170 |
| 2008/0201365 A1* | 8/2008 | Petri .......................... 707/103 X |
| 2008/0263107 A1* | 10/2008 | Sohn et al. ..................... 707/203 |
| 2008/0313496 A1* | 12/2008 | Prabhakaran et al. .......... 714/15 |
| 2009/0043867 A1* | 2/2009 | Sharp et al. .................... 709/218 |
| 2009/0144342 A1* | 6/2009 | Sudhakar ...................... 707/203 |
| 2010/0131940 A1* | 5/2010 | Jazdzewski .................... 717/170 |

* cited by examiner

SYSTEM AND METHOD FOR VERSIONING DATA IN A DISTRIBUTED DATA STORE

DESCRIPTION OF THE RELATED ART

Database systems managing large amounts of data may distribute and/or replicate that data across two or more machines, often in different locations, for any of a number of reasons, including security issues, disaster prevention and recovery issues, data locality and availability issues, etc. These machines may be configured in any number of ways, including as a shared resource pool, such as in a grid computing architecture.

Interaction between client applications and database servers typically includes read operations (queries), write operations (to store data), and update operations that can be conceptualized using a read-modify-write workflow consisting of the following steps:

The client application reads data from the database server (via a query).

The client application applies business logic and derives new or modified data.

The client application writes data back to the database server.

Transparent to the client application, a database system provides mechanisms to attempt to isolate and synchronize this workflow with regard to concurrent operations. This typically includes the ability to perform in-place updates, i.e., write operations that overwrite existing data. The problem space is well understood in the context of conventional database technology for small-scale systems, in particular for single-node systems. In such systems, various synchronization mechanisms have been developed, such as database locks, optimistic concurrency control, etc.

Database systems typically provide transactions adhering to the ACID (Atomicity, Consistency, Isolation, Durability) principle as a means to allow applications to treat batches of data modification operations atomically. The ACID principle formalizes desirable semantics for data manipulation in a declarative manner, but does not imply any particular implementation of a concurrency control model. Some systems may be implemented using a weaker set of constraints, deviating from the ACID principle in accordance with the priorities of a particular system and/or application. For example, many systems implement an eventual-consistency model, which emphasizes availability over consistency. Such a system may not be suitable for a given client application or use model.

Traditionally, concurrency control mechanisms are based on a set of standard principles:

The server maintains information that reflects which data a client application accessed.

This information is maintained throughout the time the client processes the data, e.g., server-side locks are held during this time.

The server coordinates the ordering and application of operations accordingly.

If the server is a distributed system, this information must be shared appropriately across the fleet of server nodes (e.g., using a two-phase-commit protocol).

The result is typically a tight coupling of server and client that is known to scale only to small numbers of server nodes. In addition, methods for managing different versions of stored data that are suitable for use in small-scale and/or single-node systems (e.g., versioning based on wall-clock time used with a temporal database) are not well suited for application to larger-scale distributed data storage systems, or those in which different versions of a unit of data (e.g., XML fragments of a stored document) may be stored on different nodes in a distributed system.

Figure 1:
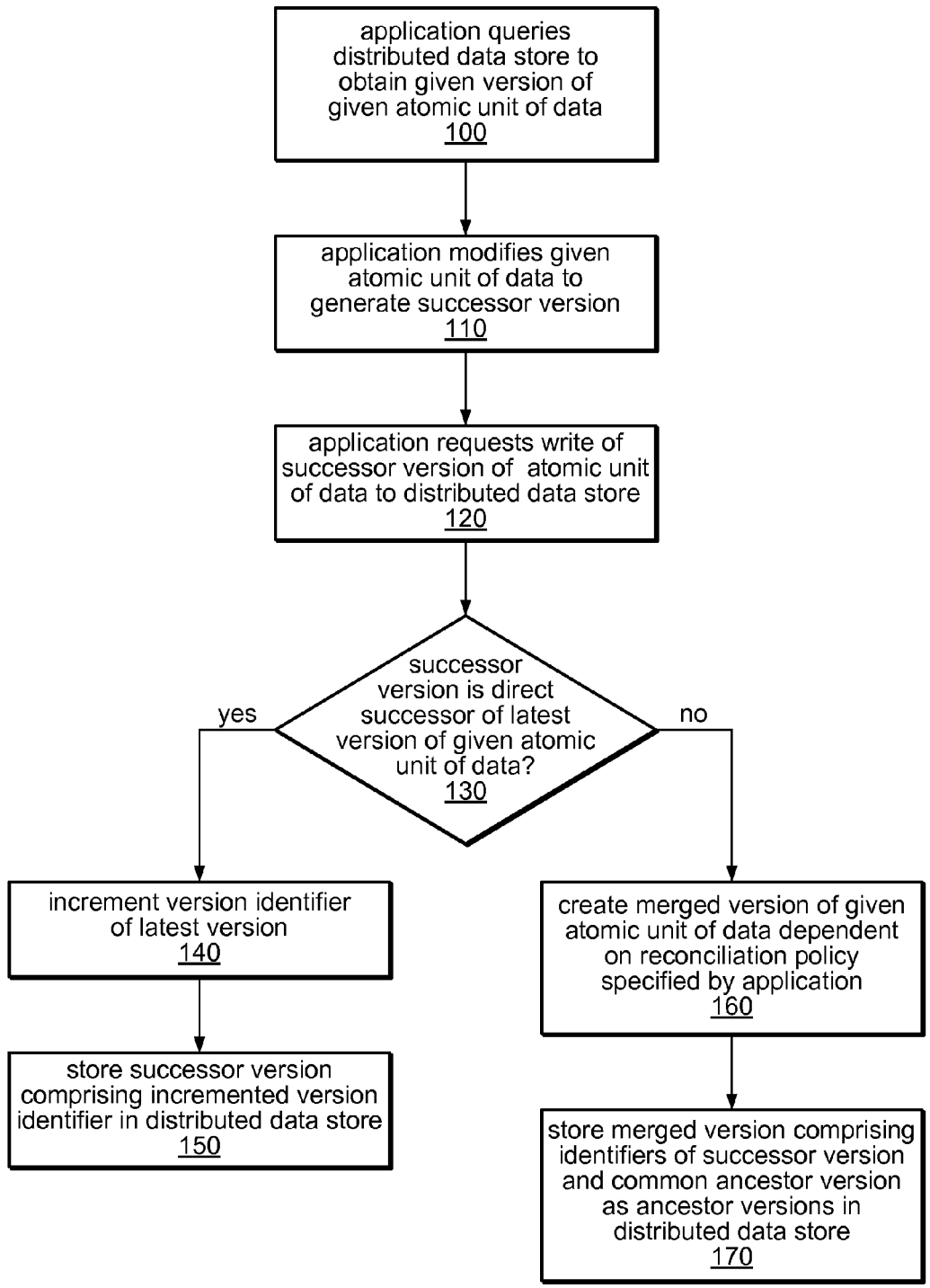
FIG. 1 illustrates one embodiment of a method for versioning an atomic unit of data.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A system and methods for versioning atomic units of data in a distributed data storage system are disclosed. The methods may be applied, for example, to versioning of XML fragments of documents, or other individual data elements, maintained by a distributed database system. While many examples described herein involve versioning of XML fragments in a distributed database, it will be understood by those of ordinary skill in the art that the methods may be applied to data of other types or formats, and/or to other types and configurations of distributed storage systems, in various embodiments. Internally, some systems may use a relational data model representation, however, the exact data representation is irrelevant. Rather, the system and methods may be thought of as operating on atomic units of data, be they XML or relational. In the examples described herein, such data units may be referred to as fragments or XML fragments to reflect a client application's point of view.

In the system described herein, all fragments include an embedded unique key. This key may in various embodiments be an application-defined key or a surrogate key generated by the system. In the examples illustrated herein, versioning is described within the scope of a given fragment (i.e., it is assumed that all fragments are versions with the same key), unless stated otherwise. In some embodiments, the granularity of versioning is limited to entire fragments. In such embodiments, no subset of a fragment can be modified (and hence versioned) on its own.

To maintain an appropriate level of consistency, the system described herein may detect and reconcile concurrent data modifications. In some embodiments, the system may provide a policy framework that allows administrators and/or client applications to specify a reconciliation policy to be automatically applied when a conflict is detected. To this end, the system may maintain version histories of the data it stores. This may enable client applications to implement different levels of consistency ranging from a plain last-writer-wins approach to an acknowledge-last-version-before-write approach, which prevents a writer from unknowingly ignoring the latest changes to the data it is about to write, thus inadvertently overwriting them. In some embodiments, either strategy, or another strategy, may be applied, depending on the requirements of a client application (e.g., individual business requirements) and/or on the type of data on which it operates.

In some embodiments, the methods for versioning atomic units of data described herein may ensure that no data is lost, i.e., that all versions are immutable (unless, for example, they are garbage collected). The methods may or may not support isolation of data. For example, in some embodiments, other clients may be able to see partial changes to data in explicitly created branches. This is described in more detail below. In some embodiments, a human administrator may be required to handle modifications and/or version management of data that is particularly sensitive (e.g., from a legal or contractual standpoint), such as by employing a two-phase-commit protocol when merging this data, while other data may be versioned automatically by the system.

The system and methods described herein for versioning of fragments may include scoping of a transaction to a single XML document, the use of a versioning concept with a linear version history, server-side conflict detection, and user-defined reconciliation policies, each of which are described in more detail below. The following components of versioning are also described in more detail herein: 1) the definition of versions and version histories, 2) the reconciliation process, and 3) the client API.

In various embodiments, the versioning methods described herein may support the following basic concepts:

Each atomic unit of data (e.g., each fragment, or database record) has a mainline branch.

The latest version of each fragment in the mainline branch may be thought of as the "tip".

A creation operation may be used to create the first version of a new fragment or record (e.g., a fragment or record having a new key).

A read operation may return the tip version, by default, or may return a specific named version.

Stored entries are not updated (i.e., overwritten). Instead, new versions are inserted. In other words, the system may create a new version each time a fragment or record is modified and then merged. Index entries may point to specific versions of fragments/records (e.g., fragments containing a specific key plus a specific version identifier).

A read-modify-write operation may involve a write using a modified copy of a specific base version. Such an operation may succeed if the base version is still the tip at the time the write is attempted (i.e., a new version was not added since the read). Otherwise the versions may need to be reconciled. Some embodiments may include support for automatic reconciliation.

Other features that may be included in various embodiments include:

An "insert-tip" operation, which adds a new version of a fragment or record. Such an operation may require no reconciliation, but may employ a last-writer-wins approach, which may be convenient (and suitable) for certain applications, but may not be suitable for others.

Support for explicit branching. In such embodiments, one or more fragments may be branched so that they may be modified. After processing them, they may be merged back to their mainline branches (e.g., individually or using a batch operation). These fragments may all be merged atomically, in some embodiments, but in others, atomicity may not be guaranteed (i.e., the system may or may not support multi-record transactions).

Scoping transactions to an XML document, which may, in some embodiments, provide a natural (and highly intuitive) boundary for transactions.

No locking of members of a branch set (e.g., variants of multiple fragments included in a given document) during merges. In some embodiments, conflicts may typically be detected before any changes are made, but atomicity may not be guaranteed. In such embodiments, part of the branch set may be merged before a conflict is encountered. (Note that in other embodiments, members of a branch set may be locked during merges, to ensure atomicity.)

Dedicated namespaces for branches, and a convenient API, examples of which are described herein.

Garbage collection of branches, as described herein.

The system and methods for versioning described herein are conceptually orthogonal to versioning mechanisms designed to detect and/or handle multi-master updates. However, their implementation may interact and/or overlap with such mechanisms, in some embodiments. In such embodiments, version identifiers may include a richer set of information, e.g., additional textual information, rather than just integers.

The system described herein may implement a protocol that is able to coordinate concurrent operations without exposing synchronization mechanisms, (e.g., locks) to the client applications. For example, in some embodiments it may prevent distributed deadlocks (allowing clients to be able to read and/or write without significant blocking time). It may also guarantee that that a client's writes are immutable once acknowledged by the server (i.e., no writes may be lost or inadvertently over-written by other client applications). In some embodiments, this may require that a client application must acknowledge the current datum before being allowed to overwrite it.

The system and methods described herein may be applicable to both state-transfer and operations-transfer. In some embodiments, the ability to apply custom reconciliation may make it unnecessary to distinguish the two. In other words, the client application designer may be able to choose a reconciliation approach from a wide spectrum of approaches, from full-copy semantics over partial updates to a highly application specific operation description. This may allow the client to submit complete units of data, partial data or even descriptions of operations, in various embodiments.

In addition, having a version trail may in some embodiments allow clients to relate data from different versions, which would not be possible in conventional database systems in which only the tip version is available. For example, a query-able version trail may allow a client application to relate different versions of data (e.g., "version 154 of order #1998423 refers to version 98 of a given line item").

One embodiment of a method for versioning an atomic unit of data is illustrated in FIG. 1. In this example, an application may query a distributed data store to obtain a given version of an atomic unit of data, as in block 100. For example, an application may query a distributed data store for a particular version (e.g., a current version or a previous version) of one XML fragment of an XML document, or a block of related records in a distributed database configured to be accessed and updated atomically during a financial transaction. The particular version requested may in some embodiments be specified using a unique version identifier, as described herein.

After receiving the atomic unit of data, the application may modify the data to generate a successor version of the data, as in 110. For example, the application may add, delete, or modify data in an XML fragment, or may add, delete, or update one or more values in one or more records obtained from a distributed database, in different embodiments.

The application may request that the successor version of the atomic unit of data be written to the distributed data store, thus storing the modified data. This is shown as block 120. The successor version may or may not be a direct successor of the latest version of the given atomic unit at the time the write request is made. For example, if the given version obtained from the distributed data store was not the latest version of the atomic unit of data, then the successor version would not be a direct successor of the latest version, but would be a direct successor of the requested version. In another example, if the given version obtained from the distributed data store was the latest version of the atomic unit of data when it was requested, but a more recent version has been written to the distributed data store since the given version was requested, then the successor version would not be a direct successor of the latest version, but would be a direct successor of the originally requested version.

If the successor version is a direct successor of the latest version of the atomic unit of data, shown as the positive exit from 130, the method may include incrementing a version identifier associated with the requested version of the atomic unit of data to generate a version identifier of the successor version, as in 140. The method may then include storing the successor version, including its version identifier, in the distributed data store, as in 150. Several examples of version identifier formats are described herein, although any suitable format may be used, in different embodiments.

If the successor version is not a direct successor of the latest version of the atomic unit of data, shown as the negative exit from 130, the method may include creating a merged version of the atomic unit of data, as in 160. As illustrated in FIG. 1, the merged version of the atomic unit of data may be created according to a reconciliation policy specified by the application, in some embodiments. For example, a reconciliation policy may specify a "last-writer-wins" policy, or a "highest-priority-writer-wins-policy" (e.g., a policy in which changes made by a "main" or "best" writer are always accepted, or in which priorities are associated with each writer and are compared during reconciliation) in some embodiments. In other embodiments, a reconciliation policy may specify a callback function to be executed to merge two versions of the atomic unit of data, or may specify an interactive approach to reconciliation (e.g., one in which a user is presented with two or more options for merging the versions and he or she may select one or more of these options). Various reconciliation methods are discussed in more detail below.

The merged version of the atomic unit of data may be stored in the distributed data store along with a version identifier, as in 170. As illustrated in FIG. 1, in some embodiments, the version identifier for a merged version may include a unique identifier of the merged version and identifiers of one or more ancestor versions. For example, the ancestors of the merged version may include the successor version modified by the application (whose identifier may be generated in a manner similar to that of the successor version described above) and/or one or more common ancestors of the successor version and the merged version. Examples of the relationships between version identifiers for successor versions, ancestor versions, and merged versions, according to one embodiment, are described in more detail below.

In the system described herein, any fragment which is, or is to be, stored in the distributed data store may contain a version tag, representing its version identifier in the version history. In some embodiments, its value may be a positive integer. As used in the examples illustrated herein, the following nomenclature is assumed. For a given fragment f, the version tag is denoted as tag(f). The interval [K,N], where $K \leq N$, is the version history of a fragment. N is called the "tip", K is called "last-known-version," and K and N grow monotonically over time. For any fragment f stored in the distributed data store, the following holds: $K \leq tag(f) \leq N$. Any fragment that is part of the version history is referred to as a committed version. In the system described herein, version tags are unique, i.e., there is a one-to-one correspondence between version tags and fragments. For every value within the version history, the distributed data store maintains a fragment with the respective tag, and the distributed data store may provide access to this fragment. For completeness, tag(NULL) is defined as 0.

In the examples illustrated herein, the ancestor relationship between fragments may be denoted by $\rightarrow$. For example, f' is called an ancestor of f'' if f'' has been derived from f'. While any fragment may be used to derive a new fragment in a transient way, e.g., in the application space, the distributed data store maintains the ancestor relationship among stored fragments. For two fragments f' and f'' stored in the distributed data store, tag(f'')=tag(f')+1 holds if and only if f'$\rightarrow$f'', i.e., f' is the ancestor of f''. Conversely, to be able to identify ancestors of transient fragments correctly, it may be required that tag(f)=tag(g) holds if and only if f$\rightarrow$g and g is transient, i.e., not stored in the distributed data store. In some embodiments, applications may read a given fragment, and modify its content, in a transient version of the fragment (i.e., one that is not meant to be stored in the distributed data store). In such cases, the application may not modify the version tag of the transient fragment, instead preserving the version tag that was included in the fragment when it was read.

Using the above definitions, a strictly linear version history may be established for each fragment, one in which each version has exactly one predecessor and one successor. To maintain this version history, concurrent updates may be synchronized, as described in more detail below. Older versions, i.e., fragments with tag(f)<K, may in some embodiments be garbage collected according to an internal, configurable strategy.

Figure 2:
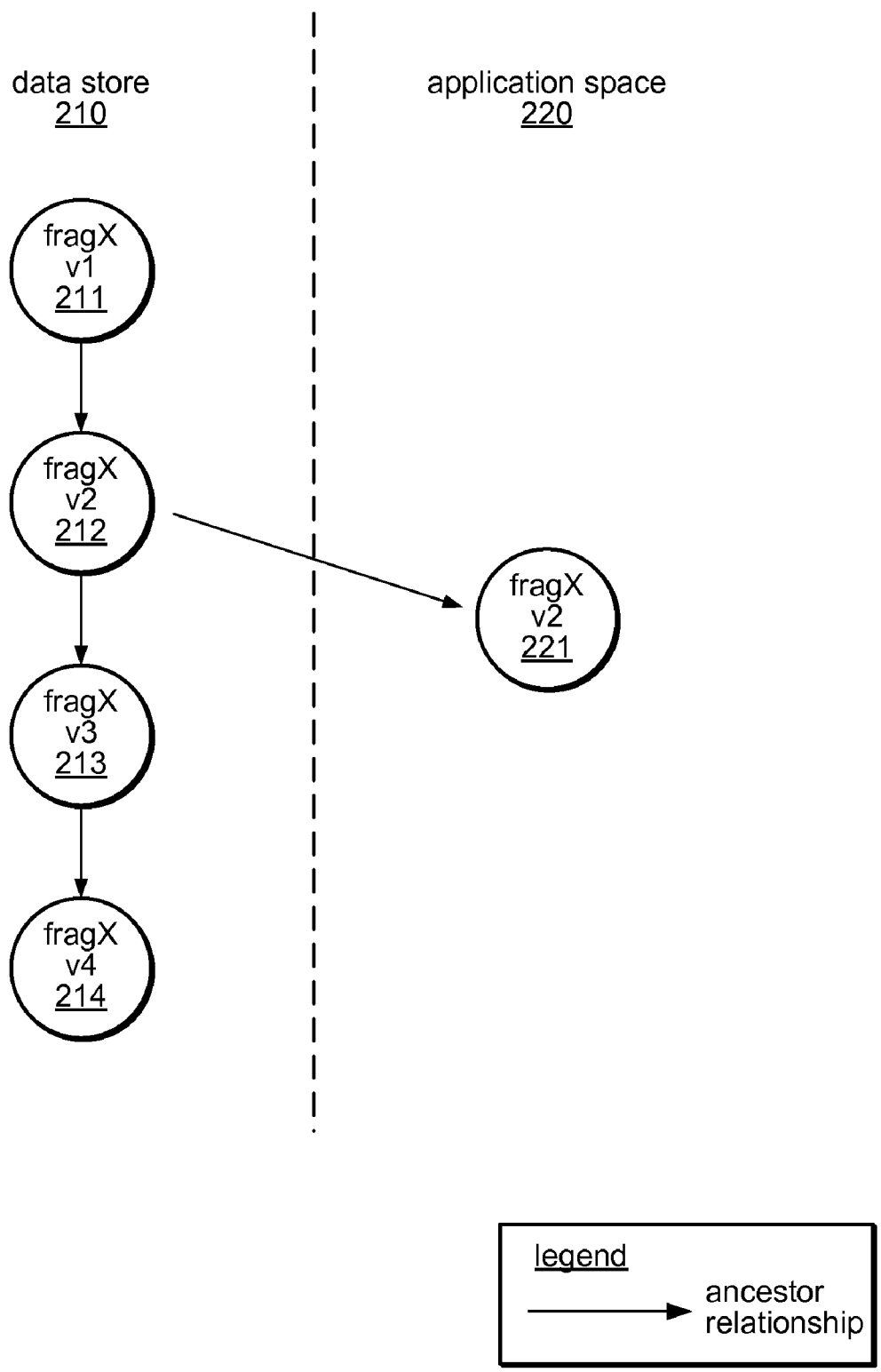
FIG. 2 illustrates a version diagram for an XML fragment, according to one embodiment.

The versioning methods described herein may be further illustrated by way of example. FIG. 2 illustrates a version diagram for an XML fragment, according to one embodiment. In this example, four versions of an XML fragment (fragX) are stored in data store 210. An arrow pointing from one version of fragX to another indicates an ancestor relationship between two versions. For example, the arrow from version 1 (v1) of fragX (element 211) to version 2 (v2) of fragX (element 212) indicates that fragX v2 (element 212) is a direct ancestor of fragX v1 (element 211). Similarly, fragX v2 (element 212) is a direct ancestor of fragX v3 (element 213), and fragX v3 (element 213) is a direct ancestor of fragX v4 (element 214).

In the example illustrated in FIG. 2, elements 211, 212, 213, and 214 are committed versions of fragX, i.e., they are immutable versions stored in data store 210. Element 221, also labeled as fragX v2, is a transient version of fragX that was requested by and passed to application space 220 for use in an application (e.g., using a read query request). As indicated by the arrow from element 212 (fragX v2) to element 221, element 212 is a direct ancestor of this transient version of fragX. In this example, element 221 may or may not have been modified by the application, but no indication is given that a modified version of this transient fragment is to be stored in data store 210. In other words, in some embodiments, there is no implicit branching of versions when they are requested by and passed to an application. The application merely receives a copy of the requested version of fragX for its own use and this fragment, whether modified or not, is not meant to be passed back to data store 210 to be stored.

Note that in the methods described herein, wall clock time may not be relevant to the definition of the version history. Rather, version identifiers may implement a logical clock, count, or other element that is incremented whenever a new version of a fragment is written. However, in some embodiments annotating versions with wall clock time to reflect the time when modifications are committed may be convenient, e.g., when querying older versions as part of operations situations.

Figure 3:
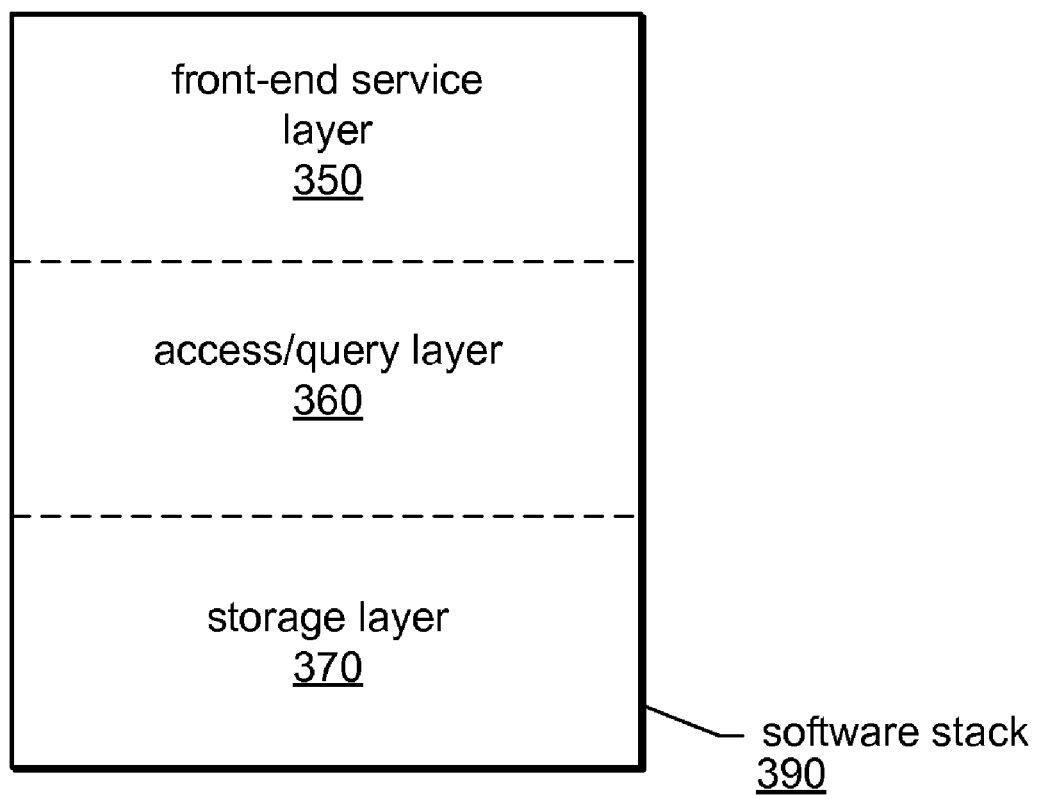
FIG. 3 illustrates a software stack for implementing versioning of atomic units of data, according to one embodiment.

The methods described herein may in some embodiments be implemented in software encoded in a storage medium (i.e., in memory) executable by one or more processors in a computing system that includes a distributed database. FIG. 3 illustrates a software stack 390 for implementing versioning of atomic units of data, according to one embodiment. In this example, software stack 390 includes three layers, a front-end service layer 350, an access/query layer 360, and a storage layer 370, although additional layers may be included in other embodiments. In the example illustrated in FIG. 3, front-end service layer 350 may include a user interface and/or various management services including, but not limited to, a parser/translator for incoming query requests, a load balancing process, a connection service, and one or more security-related components. A client application may access the distributed database by issuing requests to the front-end service layer, in some embodiments.

Access/query layer 360, in this example, may include a query processor, comprising a query server process and other functional components, in various embodiments. In some embodiments, access/query layer 360 may also include metadata storage and/or means to access this metadata. For example, metadata included in access-query layer 360 may include information suitable for determining the location of a given atomic unit of data in the distributed database. In other embodiments, this metadata storage may be included in storage layer 370 of software stack 390. Storage layer 370 may include both data storage for a distributed database and means to access and/or manage a portion of the distributed database, as described in more detail below.

The system described herein may in some embodiments provide an application programming interface (API), defining operations (requests) for client applications to use when accessing the distributed database. Several request types that may be provided in the API are described in more detail below. In various embodiments, the API may be included in access/query layer 360, in storage layer 370, or elsewhere in the system, and its operations may be invoked by including function calls specifying these requests in client application code.

In the system described herein, information about what data is located on what host node(s) may be stored as metadata and used at runtime by a query processor to determine to what nodes various portions of a query or query plan should be distributed. This metadata may in some embodiments be highly volatile due to the size of the hardware infrastructure and any failures or maintenance operations that may occur during operation of the system. In various embodiments, metadata indicating what data is located on what host node(s) may be stored locally on each host node. This metadata may be updated locally in some embodiments, such as in response to a hardware configuration change, the election of a new master node for a cluster, or the move of a data partition from the host node to another host node. In some embodiments, this metadata may be updated globally, using information received from one or more other host nodes in response to such changes. In various embodiments, the metadata stored on each node of a fleet may or may not be synchronized with the metadata stored on other nodes. In some embodiments, metadata may be synchronized on the nodes of a particular cluster or on nodes storing data for a same data partition.

In some embodiments, data may be organized as collections that are partitioned across a number of sites. The partitioning (e.g., the distribution of ranges of a primary key to various sites) may in some embodiments be exposed to a query processor in the form of a partitioning function. In various embodiments, the partitioning of data may be managed by a front-end server, or by query processors on multiple nodes of the system, and may be transparent to the client application. Both user data (i.e., application data) and system data (e.g., data exposed through system tables) may be transparently partitioned in the system, in different embodiments.

The system described herein may or may not expose the concept of a transaction to client applications. In other words, in some embodiments the system may not support a means for a client application to specify that a sequence of operations be treated atomically with respect to concurrent client operations. Internally, however, the system may utilize transactions on a per-site basis. For example, data access operations such as table scans, index accesses, etc., may be part of a transaction (i.e., the associated read operators may access local data transactionally). In some embodiments, the storage layer may provide deadlock detection and resolution within one site. For example, once a deadlock is detected, a victim may be chosen and the associated process may be killed, triggering a clean-up of the remainder of the query. The system may in some embodiments implement distributed transactions that are used internally for certain types of data modifications (e.g., metadata modifications). In some embodiments, an application may choose whether or not to support such transactions (e.g., dependent on a policy or guideline, and/or in situations in which their impact is suitably limited). In different embodiments, transactions may or may not be used in conjunction with (and may or may not be supported by) the system and methods described herein for versioning of atomic units of data (e.g., XML fragments). Versioning in the context of transactions is described in more detail below.

Using the above definitions, various operations may be defined from an application's point of view, such as operations to create, read, branch, and merge fragments. A creation operation may in some embodiments be called to insert a new fragment into the distributed data store if no fragment with the same primary key is found, otherwise the operation may abort. In some embodiments, the API may provide, and expose to the client, a built-in creation function.

Figure 4:
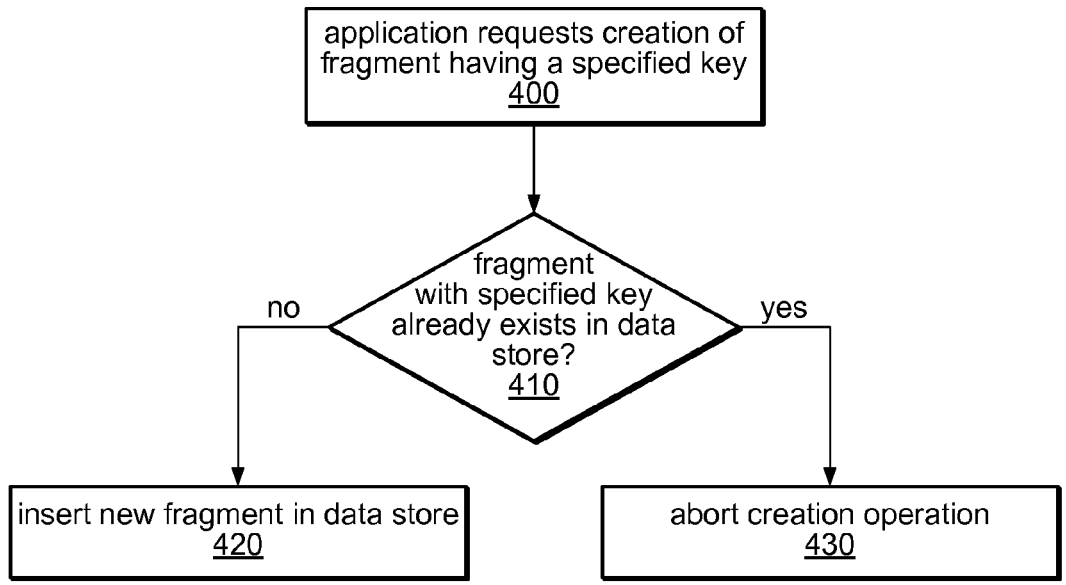
FIG. 4 illustrates one embodiment of a method for creation of a fragment version.

One embodiment of a method for creation of a fragment version is illustrated in FIG. 4. In this example, an application may request creation of a fragment having a specified key, as in block 400. If a fragment having the specified key already exists in the data store, shown as the positive exit from 410, the method may in some embodiments include aborting the creation operation, as in 430. If, on the other hand, no fragment having the specified key already exists in the data store, shown as the negative exit from 410, the method may include inserting a new fragment in the data store, as in 420.

Distinguishing the initial creation of a fragment from a merge operation may in some situations be beneficial. However, a large number of applications may deploy a last-writer-wins or a highest-priority-writer-wins reconciliation approach. Such approaches may ignore any previous versions, i.e., ignoring whether or not a fragment with a given key already exists in a document when creation of a fragment is attempted.

In embodiments in which insert and write operations are differentiated, applications may be required to execute a check first to see whether the fragment exists, and based on the outcome choose to merge a new fragment with the existing fragment (e.g., using a write operation) or to use an insert (create) operation to insert the new fragment. In some embodiments, this decision may concern only the operation used to write the fragment. Semantically, neither operation may take the actual content/value of the fragment into account. Hence, some embodiments may provide a built-in unified create/merge operation in addition to standard create and merge operations. Such a built-in function may in some embodiments remove the burden on the client application of explicitly checking for an existing fragment, such as if the application itself does not need to know if the fragment already exists. A create/merge operation may in some embodiments apply similar considerations as a stand-alone merge operation, described below, with respect to locking.

Figure 5:
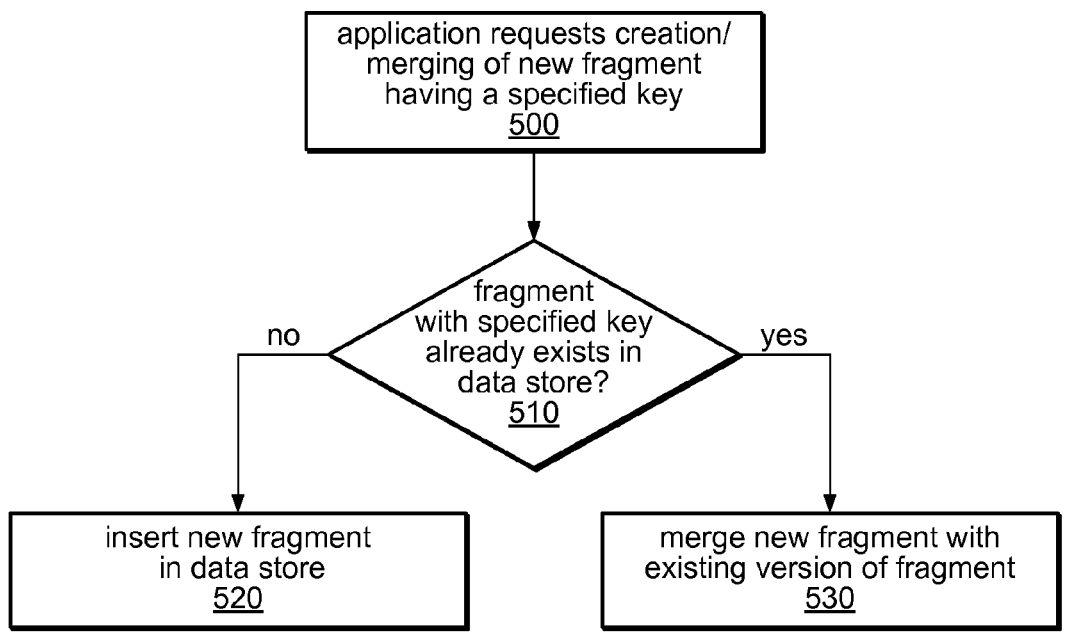
FIG. 5 illustrates one embodiment of a method for creating and/or merging a new fragment version.

One such unified create/merge operation is illustrated in FIG. 5, according to one embodiment. In this example, an application may use a unified create/merge operation to request creation of a new fragment having a specified key, as in 500. If a fragment containing the specified key already exists in the data store, shown as the positive exit from 510, the method may in some embodiments include merging the new fragment specified in the request with an existing version of a fragment having the specified key (e.g., the tip version).

If, on the other hand, no fragment having the specified key already exists in the data store, shown as the negative exit from 510, the method may include inserting a new fragment in the data store, as in 520.

A read operation may allow applications to access any given fragment version in the distributed data store. For example, an application may query the distributed data store for a fragment having a specific key and version identifier, in some embodiments, and the distributed data store may return the specified version, along with its metadata. If no particular identifier (or timestamp, in a temporal system) of a version is provided in the query, the distributed data store may be configured to return the tip. The returned committed fragment may be guaranteed to contain a valid version tag. In some embodiments, the distributed data store cannot infer whether a read is done with the intention to modify and write the fragment later, and no guarantees are made that the version read is preserved until a subsequent write attempt. In other words, in such embodiments, no implicit branching is supported. In the case of explicit branching, described in more detail below, the distributed data store may assume that the fragment will eventually be committed back to the data store (and may annotate the fragment to indicate that garbage collection should be delayed or prevented, in some embodiments). In some embodiments, the read operation is exposed through the system's standard query language, and no separate API in the form of a built-in function is needed.

As used herein, a merge operation may refer to a write attempt that triggers reconciliation, as necessary. In some embodiments, the actual write operation may be implemented as part of a transaction. In some such embodiments, the caller (e.g., the client application) may be configured to manage the transaction. For example, in these embodiments, the client application may handle cases when the transaction is aborted by the system, (e.g., the transaction has been selected as deadlock victim, etc.). Client applications may also be responsible for handling merging operations, in some embodiments, or may specify a reconciliation policy to be applied by an automatic reconciliation mechanism. In other embodiments, the distributed data store may employ an automatic reconciliation mechanism, or may select from among supported reconciliation mechanisms based on a system-wide policy, an application type or category, a data type, business or legal requirements, or on other considerations.

As noted above, multiple, alternative procedures for merging may be supported in a distributed data store, including callback reconciliation and interactive reconciliation. In some embodiments, the choice of the merge method may be specified on a per-application or a per-document basis. The selection of the method may be specified in the application or by an administrator (or administrative function) and may require special privileges to be changed. For a given workload, the different merge strategies may deliver different performance. However, they may not differ in terms of semantics or consistency guarantees with respect to the results. In some embodiments, the distributed data storage system may provide a built-in merge function, which may handle merges in the manner specified, as described above.

As described herein, reconciliation is the process of unifying a transient fragment with the tip of a version history. In some embodiments, reconciliation may strongly depend on the semantics associated with the data, and may not be performed in an automatic way, in general. Notable exceptions include last-writer-wins or higher-priority-writer-wins reconciliation approaches, as discussed above. Instead of imposing restrictions on the type of reconciliation that can be performed, the system described herein may enable applications to choose one of several standard approaches or to apply custom reconciliation logic. Custom reconciliation logic, together with the ability to store any supplemental context information in the data fragment as part of the physical design of the application, may in some embodiments subsume both schema-based and operation-based reconciliation.

In some embodiments, the system described herein may provide a reconciliation function. For example, a reconciliation function may be registered as a callback function as part of the definition of the data collection. Such a function may include three input parameters: f t, and f'', such that f''→f and f''→t, with f being the transient fragment, t being the fragment to reconcile with (the tip), and f'' being the common ancestor. The reconciliation function may return a fragment g with $tag(g)=tag(t)$. The previous conditions imply $tag(f'') \leq tag(f) \leq tag(t)$.

For example, in the case of last-writer-wins or highest-priority-writer-wins, the reconciliation function may simply return f but may change its version tag so that $tag(f)=tag(t)$ holds. In these cases the third parameter, f", may be NULL. This may be referred to as a "baseless merge" as no common ancestor can be (or needs to be) consulted in the reconciliation process.

When applying the reconciliation function, several cases may need to be distinguished. In these example, let t be the tip of the version history:

1) tag(D=tag(t) In this case, f is derived from the version tip. No reconciliation is necessary.

2) K<tag(D<N In this case, the version tip is not the direct ancestor of f. In other words, one or more reconciliations of the tip with other transient fragments have occurred since reading f.

3) tag(f)<K In this case, the transient fragment has been derived from a version which is no longer stored in the system as part of the version history. In other words, this version from which it was derived may have been garbage collected. In this case, the reconciliation function may be called with (f, t, NULL), i.e., a baseless merge may be performed.

Note that, depending on the transactional context in which reconciliation is performed, the tip may have been modified in the time between passing it into the reconciliation function and obtaining the reconciled fragment. In this case, the reconciliation may need to be repeated with a copy of the new tip fragment.

Figure 6:
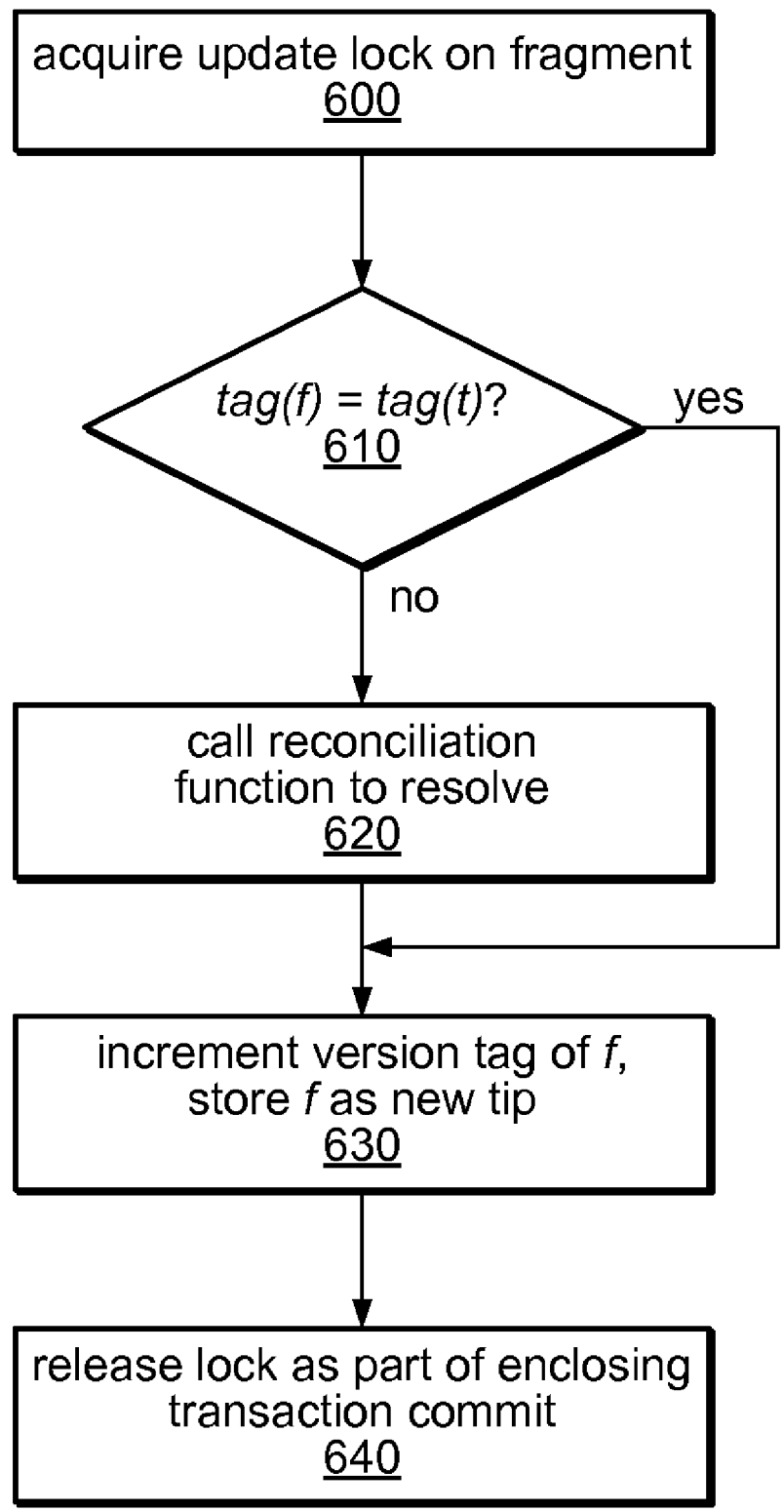
FIG. 6 illustrates a method of reconciling fragment versions during merging, according to one embodiment.

One method of reconciling fragment versions using a callback function is illustrated in FIG. 6. This method employs "locked reconciliation," which may reduce the number of reconciliation attempts necessary to one, in general. This method may not guarantee success on the first attempt, as the write operation may be subject to potential transaction aborts on the underlying database level.

In this example, the method may include acquiring an update lock on the stored fragment of interest, as in 600. This lock may in various embodiments prevent any other updates to the fragment, such as another merge attempt, while the lock is held. As illustrated in FIG. 6, the method may include determining if the transient fragment was derived from the current version tip. Using the same notation as in the examples above, this determination includes determining if the tag of the transient fragment is the same as the tag of the tip, as in 610.

If it is determined that tag(f) is the same as tag(t), shown as the positive exit from 610, the method may include incrementing the version tag of the transient fragment, and writing the transient fragment to the data store, where it becomes the new tip. This is shown as block 630.

If, on the other hand, it is determined that tag(f) is not the same as tag(t), shown as the negative exit from 610, a reconciliation function may be called to resolve the conflict and merge the transient fragment with the current tip. In some embodiments, the reconciliation function may be called as part of a transaction. This may guarantee that the first reconciliation attempt succeeds, since the fragment may be locked during this time. This may also reduce the odds of starving a process that attempts to merge a change that causes the reconciliation function to perform slower than other changes (for which reconciliation is fast). As previously noted, such a reconciliation function may be specified by the application, in some embodiments, and/or may be dependent on a reconciliation policy for the application and/or its data. Once the reconciliation function has been executed, the resulting merged fragment may be considered to satisfy the condition tag(f)=tag(t), and the method may continue as in 630.

Once the new tip has been written to the data store, the update lock may be released, as in 640. In some embodiments, releasing the lock may be performed as part of an enclosing transaction commit step.

Holding locks during reconciliation, as in the method illustrated in FIG. 6, may in some embodiments increase the total time fragments are locked for updates. Since this may potentially impact throughput, the reconciliation function may in some embodiments be limited to operations that do not lock resources that are outside the reach of a local deadlock detection algorithm. However, given the logic typically exercised as part of the reconciliation process, accessing external resources may in many embodiments not be an issue.

Figure 7:
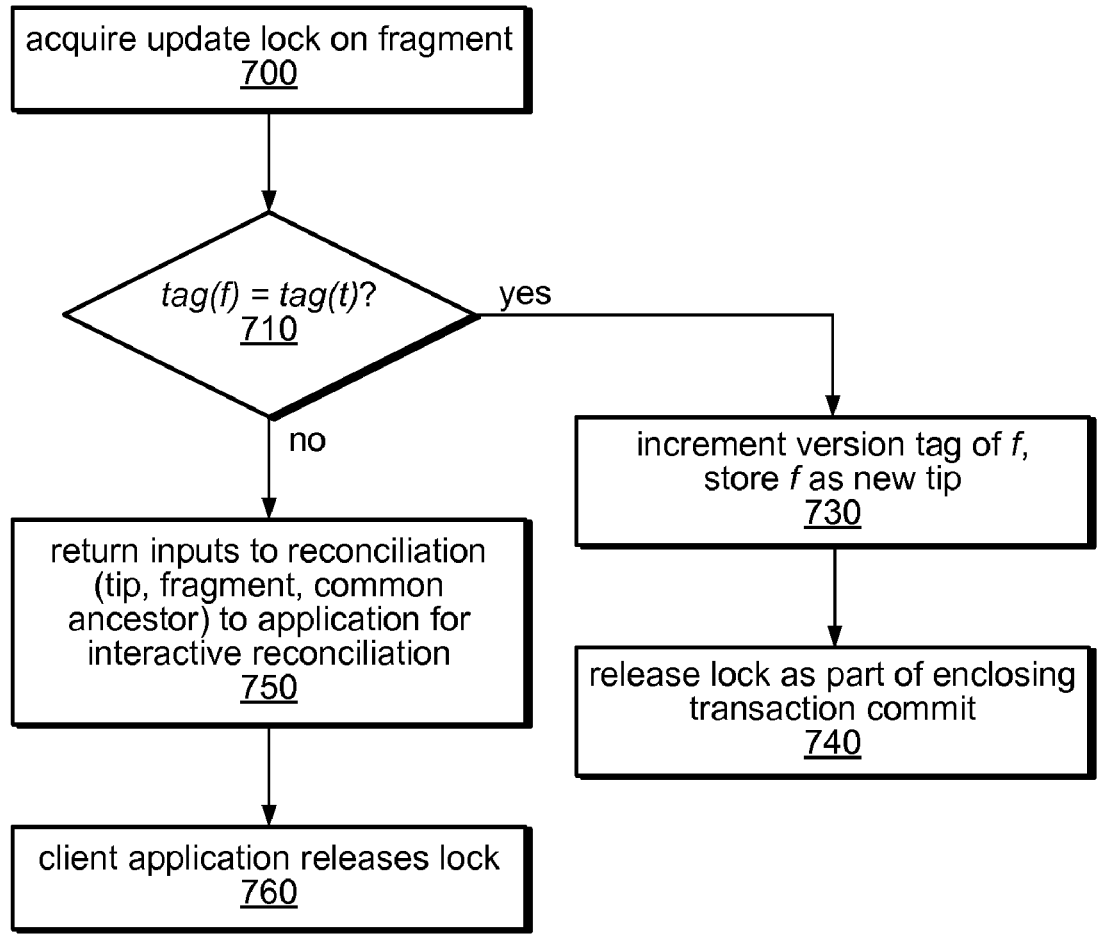
FIG. 7 illustrates a method of reconciling fragment versions during merging, according to another embodiment.

One embodiment of a method of reconciling fragment versions using an interactive mechanism is illustrated in FIG. 7. This method employs an "unlocked reconciliation," which does not attempt to reduce the number of reconciliations necessary. Instead, using this method, a failed write may simply return the inputs to the reconciliation (i.e., the fragment, the tip, and one or more common ancestors), to the client application for resolution.

In this example, the method may include acquiring an update lock on the stored fragment of interest, as in 700. This lock may in various embodiments prevent any other updates to the fragment, such as another merge attempt, while the lock is held. As illustrated in FIG. 7, the method may include determining if the transient fragment was derived from the current version tip. Using the same notation as in the examples above, this determination includes determining if the tag of the transient fragment is the same as the tag of the tip, as in 710.

If it is determined that tag(f) is the same as tag(t), shown as the positive exit from 710, the method may include incrementing the version tag of the transient fragment, and writing the transient fragment to the data store, where it becomes the new tip. This is shown as block 730. Once the new tip has been written to the data store, the update lock may be released, as in 740. In some embodiments, releasing the lock may be performed as part of an enclosing transaction commit step.

If, on the other hand, it is determined that tag(f) is not the same as tag(t), shown as the negative exit from 710, the inputs to reconciliation (e.g., the tip, the transient fragment, the common ancestors, etc.) may be returned to the client application for interactive reconciliation. For example, the client application may present information to a user indicating options for merging the transient fragment back into the data store, such as selecting the transient fragment to be the new tip, discarding the transient fragment, specifying that the union of the data in the input versions should be included a merged version, specifying that the intersection of the data in the input versions should be included a merged version, or any other options, including application-specific options.

As illustrated in FIG. 7, once the inputs to reconciliation are returned to the client application, the lock may be released. This is illustrated as 760. For example, in some embodiments, the client application may be configured to abort the attempted write (merge) transaction and release the lock, which may increase throughput. In other words, in this example, the interactive reconciliation process itself occurs without the fragment being locked. If the transaction is aborted, the reconciliation function of the client application may in some embodiments access and lock arbitrary resources without running the risk of deadlocking with local transactions. In other embodiments, an interactive reconciliation process may include holding an update lock until the reconciliation is complete.

After the transient fragment is merged with the tip, the client application may again attempt to update the fragment using the merged transient fragment, using the method of FIG. 7, and beginning at 700. If no other updates have been performed on the fragment since the initial merge attempt, the condition tag(f)=tag(t) may be met on the second attempt, and the method may continue through steps 710, 730, and 740. If necessary, this process may be repeated until the merge attempt succeeds.

A lack of support for application-specified transactions may in some embodiments limit operations, and the application of the versioning methods described herein, to individual fragments and individual modifications thereto, rather than to collections of fragments, or collections of changes to a given fragment. For many business applications, this mode of action may be both appropriate and sufficient, if most business logic in these applications is of a short-running nature and if it operates on individual fragments only. However, in other applications, it may be more convenient to perform long-running work that includes repeated updates to one or more fragments without making the changes visible to other readers while the work is not yet completed. Introducing explicit branching into the system may in some embodiments allow applications to work on "private" copies of fragments that are written to a temporary storage location. In such embodiments, once the whole task is completed, all private versions may be merged back into the mainline branch.

On the API level, the following three major operations may be distinguished in a system supporting explicit branching:
  Creating a branch
  Populating a branch by integrating fragments of interest, including refreshing previously integrated fragments
  Merging a branch back into its parent branch The mainline of a version history is a branch, although a distinguished one, by itself. In the following examples, branches may be referred to as child branches and parent branches to indicate the direction in which fragments are branched (from parent into child) and merged back later (from child into parent). Note that as used herein, the terms "child branch" and "parent branch" are not meant to imply any particular hierarchy among the branches, but serve merely to distinguish sources and destinations of branch and merge operations. From a distributed data storage system's point of view, branching may provide advantages with respect to garbage collection:

1) Declaring a branch may state the application's explicit intention to reconcile descendants of a particular version. The system may keep track of which versions might be needed for reconciliation later on, and may exempt them from the standard garbage collection policy.
2) All versions in a branch may be conceptually related to the same task. If the task is abandoned prematurely, the system may be able to garbage collect fragments and common ancestors association with the task effectively.

Branches may in some embodiments be solely a matter of convenience, implementing collections that can be modified in isolation; they may not add to the expressiveness of the model. However, in other embodiments, branches may be used to implement and incorporate multi-master updates in the previously presented system. Multi-master updates may in some embodiments be implemented as a specific application of branching. For example, in various embodiments, explicit branching may be supported, as described herein, and the decision to create branches and enable independent, branched versions (and hence, multi-master update semantics) may be left to the client application, with or without server-side support for multi-master updates.

As described herein, a branch may be a virtual document (or other collection of atomic units of data) that is associated with a parent branch, e.g., the mainline branch. The association may be a metadata annotation that establishes a lineage of each fragment back to its parent branch. The creating of a branch may involve a declaration that establishes the virtual document but does not copy any data from the parent branch. In other words, the creating of a branch may not be equivalent to creating a "snapshot" of a given parent branch. Rather, it may merely create what is essentially an empty virtual document that the application/client may choose to populate selectively afterward.

Creating a branch may in some embodiments involve creating indexes over the child branch analogous to the parent branch. In the case that a callback function for reconciliation has been defined on the parent branch, the function may also be used on the child branch. In the system described herein, branches are an explicit concept, that is, the application may need to be aware of the branch, and may address the data in the branch specifically by using the branch's name in the query text. Branches may be named according to any suitable convention, or without restriction, in different embodiments.

Figure 8:
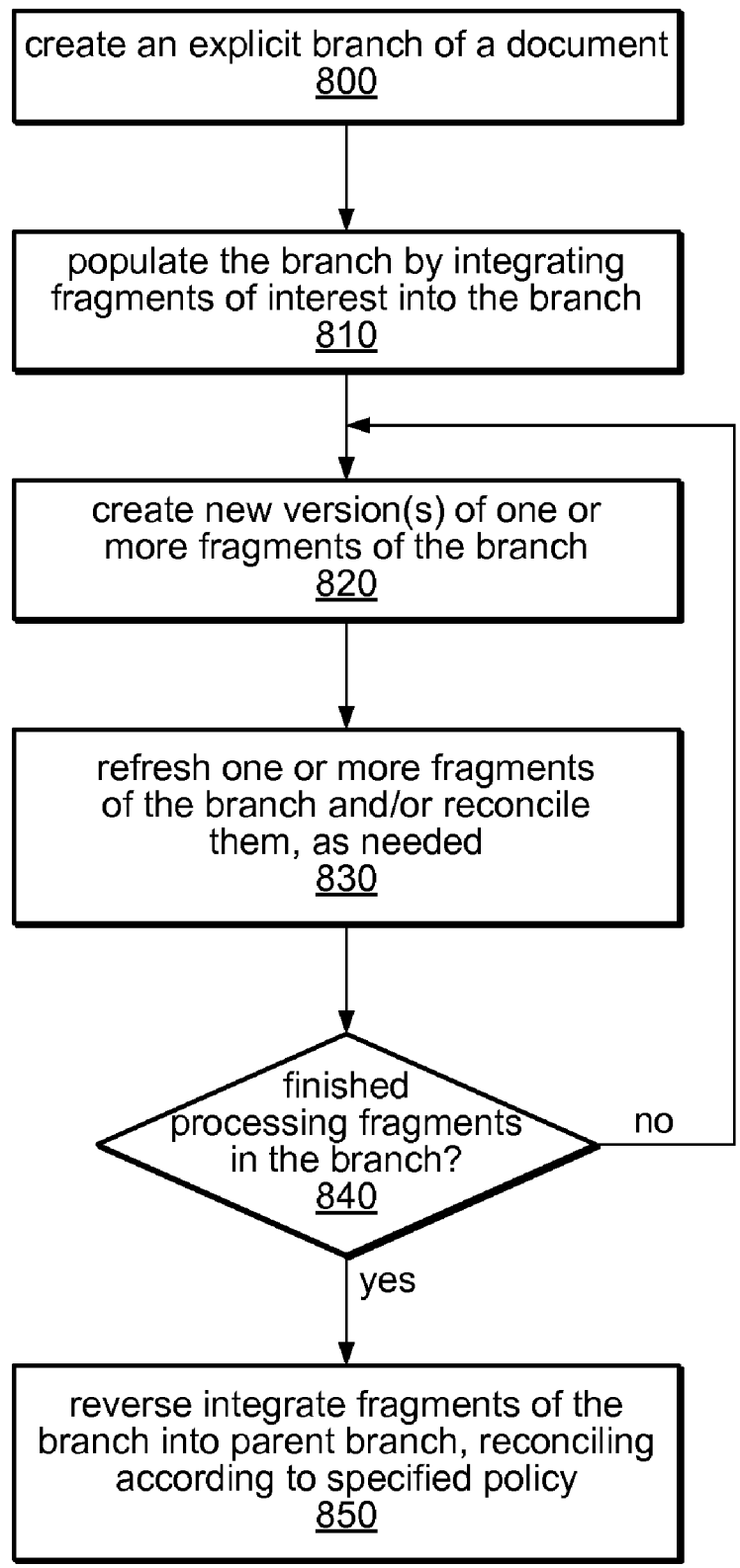
FIG. 8 illustrates a method for explicit branching of a document, according to one embodiment.

FIG. 8 illustrates a method for explicit branching of a document, according to one embodiment. In this example, the method may begin when an application creates an explicit branch of a document, as in 800. As described herein, a branch may be declared using a command of the API. The branch may be populated by integrating fragments of interest (e.g., particular versions of specified XML fragments) into the branch, as in 810. For example, a document may be populated by integrating fragments obtained through a query of the data store, in some embodiments.

The method may include creating new versions of one or more fragments of the branch document, as in 820. In other words, each of the fragments in the branch document may be modified and new version identifiers may be associated with each of the modified versions, as previously described. In some embodiments, the method may include refreshing one or more fragments of the branch document, as shown in 830. For example, the data store may be queried using the key of a fragment that is included in the branch, and the latest version of that fragment may be returned. If the tag of the latest version (i.e., the current tip) is not the same as the tag of the fragment when it was initially obtained to populate the branch (or when it was last refreshed), a reconciliation process may be performed. If the tag of the tip has not changed since the fragment was integrated into the branch (or last refreshed), no reconciliation may be required.

The operations illustrated in 820 and 830 may be repeated until the application has finished processing the fragments in the branch document. For example, new versions of each of the fragments in the branch document may be created and/or refreshed until a point at which the application has completed its work, or until the application attempts to reconcile the fragments of the branch document with those of their parent branches. This is illustrated as the feedback loop from the negative exit from 840 to 820. Once the application has finished processing the fragments in the branch, shown as the positive exit from 840, the modified fragments of the branch document may be integrated back into their parent branches, as in 850. This is sometimes referred to as "reverse integration." As illustrated in FIG. 8, reverse integration may include reconciling the modified fragments with their counterparts in the mainline branch of each fragment, according to a specified policy and/or reconciliation process, such as those described herein.

In the examples described herein, branching a fragment may refer to the step of copying a fragment of interest from a parent branch into a child branch. During a branching operation, the system may maintain metadata that records the parent branch and the version of the fragment when it was copied. Within the branch, the fragment may be versioned, as described above. In order to populate the branch with a desired subset of fragments from the parent branch, it may seem intuitive to query the parent branch and simply store the query result in the branch. However, to ensure that the metadata that associates the branched fragment with the parent is not tampered with, either intentionally or inadvertently, the initial copy may in some embodiments be made through a special API. Instead of just "writing" the fragment to the branch, the fragment may be "integrated" into the branch using the API.

For example, assume a branch with the name myItems.xml, which is a child of Items.xml, has been created. To populate myItems.xml only with items manufactured by manufacturer ABC, a query similar to the following may be used:

for $item            doc("items.xml")/items [@Manufacturer='ABC']
        return integrate("items.xml", "myItems.xml", keyof ($item))

As noted above, branching may be key-based, i.e., the integration step may look up the items in question by their keys and may attempt the merge step given the data queried. This scheme may prevent mid-flight data modifications, which may corrupt the lineage of the fragment during the integration step. More generally, scenarios that involve branching functionality may be broken down into a query phase, in which fragments of interest are identified, and the actual integration step, in which they are copied and/or merged into the child branch.

For example, the following code (or similar) may be used in synchronizing a branch from its parent branch, as part of the preparation to integrate the changes back into the parent branch. In some embodiments, this may be a frequent pattern of workflow, and may be used to avoid performing unnecessary operations as part of the integration:

for $item in collection("normalized.xml")/item
    for $myItem in collection("myNormalized.xml")/item
    where $item/@key=$myItem/@key
    return integrate("normalized.xml", "myNormalized.xml", keyof($item))

Figure 9:
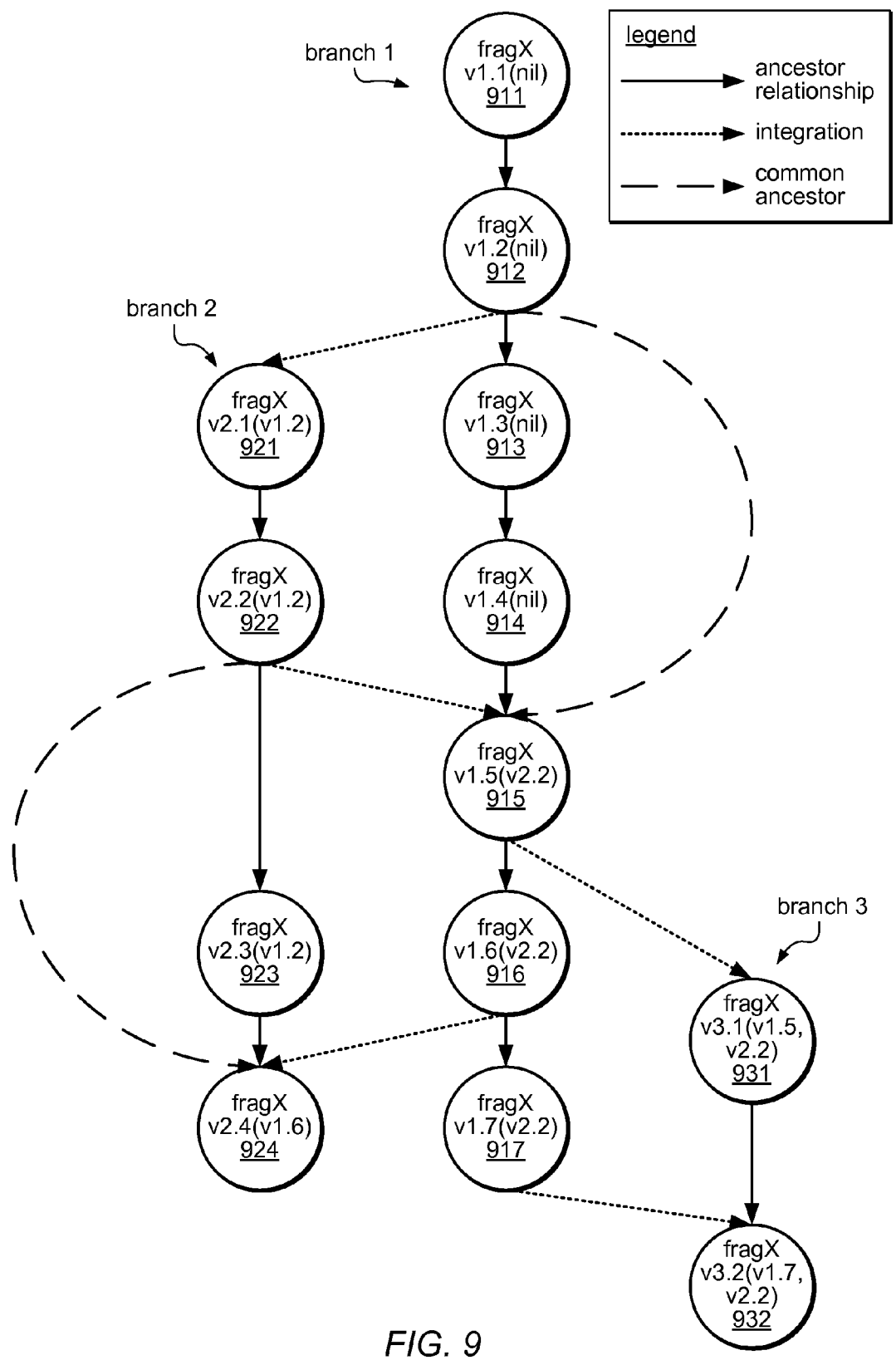
FIG. 9 illustrates a version diagram for a fragment comprising three branches, according to one embodiment.

FIG. 9 illustrates a version diagram for an individual fragment, fragX, comprising three branches, according to one embodiment. In this example, an operation such as "integrate" may be invoked using the key of the item to look up the actual fragment in the parent branch Items.xml, to write the fragment into the child branches, and to record the metadata associated with the fragment (i.e., parent branch and versions of the fragment, accordingly).

In this example, the format branch.version is used for version tags to enhance readability, although many other formats may be equally suitable for identifying the branch and version of each fragment version. In FIG. 9, solid arrows are used to indicate ancestor relationships, dotted arrows are used to indicate integration of fragment versions into a branch, and dashed arrows are used to indicate common ancestors. As illustrated in FIG. 9, the version tree begins with a version of fragX annotated as v1.1 (element 911), indicating that it is included in branch 1 and is the initial version of the fragment in this branch. This fragment is modified within branch 1 resulting in version 1.2 (element 912). No additional metadata annotation is needed for this version, signified by nil.

In this example, the fragment is explicitly branched and written to branch 2 as version v2.1 (element 921), annotated with v1.2 as its ancestor in branch 1. The fragment is modified and versioned independently within each branch as v1.3 (element 913), v1.4 (element 914), and v2.2 (element 922), respectively. However, integrations need not branch from the tip of the parent branch, but in some embodiment may be based off any older version. In some embodiments, operations may be required to start out with older versions of the data, i.e., branching only fragments that are not the tip of their respective version histories.

In some embodiments, fragments may be integrated into the child branches using a create/merge function, as described above, to insert the fragment. This may allow integration of the fragment into the branches to "refresh" the data as part of the integration operation. When merging more recent versions into the child branch, conflict resolution may be triggered automatically if the target fragment in the child branch has been modified since the last integration. If the fragment has not been modified since the last integration, the more recent version from the parent branch may overwrite the fragment in the child branch. For example, see v3.1 (element 931) and v3.2 (element 932) in FIG. 9. Attempts to integrate older versions, such as the integration of v1.1 (element 911) into branch 2 after v1.2 was integrated, may in some embodiments be detected and ignored.

After processing fragments in the branch, the application may choose to "push" the changes back into the parent branch, i.e., reverse integrating the fragments. For each fragment in the child branch that has changed since integration, the common ancestor in the parent branch may be determined (e.g., from the associated metadata) and a reconciliation operation may be performed. Note that the data necessary to discern a change has been omitted in FIG. 9 for clarity, but may be included in metadata associated with the fragment version history. The fragment may be reconciled using any suitable mechanism, including those described herein. As illustrated, the metadata associated with the fragment version may be annotated with the branch and version information from the child branch. The branch version referred to by the metadata may be thought of as the common ancestor within the child branch. In some embodiments, integration may always target the tip of a branch, which requires reconciliation with the current tip fragment if it has been modified since the previous integration. For example, v2.3 (element 923) and v1.6 (element 916) share a common ancestor in v2.2 (element 922). Therefore, when the fragment is refreshed to generate/integrate v2.4, the changes in each branch since v2.2 (element 922) may be taken into account during reconciliation. In some embodiments, similar mechanisms are applied for reverse integrations to avoid treating parent and child branches differently.

To further illustrate this situation, consider fragments v2.2 (element 922) and v1.4 (element 914) in FIG. 9. Using the information that v1.2 (element 912) is the common ancestor of the two fragment versions (shown by the dashed arrow at the point of the creation/merging of v1.5), the two fragments are merged into v1.5 (element 915), which is then annotated with v2.2. In this example, fragments that were created in the child branch (branch 2) have no corresponding fragment in the parent branch (branch 1). The fragment v1.5 (element 915) is created in the parent branch during reverse integration. Essentially, the reverse integration uses the same mechanism as the integration from parent to child, with the roles of the branches reversed.

As illustrated in the example in FIG. 9, fragments may be modified and versioned independently within a branch at any point, including after an integration or reverse integration operation. For example, version 1.6 (element 916) has only v1.5 (element 915) as its direct ancestor. In this example, however, it is annotated with a common ancestor from branch 2 (v2.2), based on the reverse integration that created v1.5 (element 915), and this information may be used in the case of a future integration or reverse integration, as described above regarding the creation/integration of v2.4 (element 924). Similarly, v1.7 (element 917) has only v1.6 (element 916) as a direct ancestor, but is also annotated with a common ancestor in branch 2 (v2.2).

In the example illustrated in FIG. 9, a third branch, branch 3 is created by initially branching the fragment from v1.5 (element 915). The initial fragment in this branch (element 931) becomes v3.1, and is annotated with a common ancestor from each of the other branches. In this example, v3.1 (element 913) is annotated with v1.5 (the fragment version in branch 1 from which it was integrated) and with v2.2 (its common ancestor from branch 2, inherited from v1.5). In this example, the fragment is refreshed (re-integrated) from branch 1 into branch 3 as v3.2 (element 932), by merging it with the tip of branch 1, element 917 (v1.7). This version is annotated with its ancestors in branch 1 (v1.7) and in branch 2 (v2.2, inherited from v1.7).

As noted above, during each integration operation, the mechanism may record the branch and version of the source fragment. That is, the metadata recorded in each fragment may grow linearly with the number of branches from which the fragment has been integrated. For example, if a parent branch has N child branches, the fragments may be annotated with up to N common ancestors, one from each branch (see, e.g., elements 931 and 932). In practice, N may typically be small. In some embodiments, the metadata can be garbage collected as branches are deleted. The metadata may be stored as part of the data in each fragment. Note that entirely new fragments may also be created directly in a branch without integrating from a fragment in the parent branch, but by introducing them in the parent branch as part of a reverse integration.

In order to facilitate the merge process, the system may provide auxiliary functionality that allows checking whether versions in the target branch of a merge would cause conflicts without undertaking the actual merge attempt. In some embodiments, since the entire version history of a fragment within the target branch is visible, a simple query may be run to determine the number of collisions expected. Note that in some embodiments no locks are acquired as part of this process, which means the result may not be reliable, i.e., the fact that no collisions are detected before attempting the merge does not guarantee that no collisions will occur during the actual merge due to late modifications. However, in practice, the aforementioned check may serve to set the client's expectations accordingly. This functionality may be implemented and exposed to client applications, e.g., as a built-in function of the API.

In some embodiments, once the task for which a branch was created has been terminated, the branch may be terminated as well. A terminated branch may no longer accessible. Termination of a branch may trigger garbage collection of all data contained in the branch, in some embodiments.

As described above, branches may be an explicit concept in the system (i.e., data in a branch may be addressed using the branch name). Therefore, a query may in some embodiments span several branches. In particular, a query may in some embodiments be able to read older versions (e.g., from another branch) and take their data into account when modifying fragments within a branch. This situation may in some embodiments be anticipated in operations situations, in which branches may used to rectify data corruption, etc. In such situations, a child branch may be created, and after inspecting fragments and their ancestors in the parent branch, corrected versions of the fragment may be written to the child branch. After this process is complete, the branch may be checked or further processed. Once the task is complete and the data in the branch is considered ready-for-merge, a reverse integration may be triggered.

Initially integrating a fragment across branches may in some embodiments be interpreted as the splitting of the lineage of the fragments, and reverse integrating or refreshing may be seen as merging of the lineage of two fragments. The former may duplicate not only the actual data payload of the fragment, but also the metadata associated with it. In the latter case, the system may merely annotate the resulting fragment with the version tag of both ancestors. For example, in some embodiments, the ancestor's version tag within the branch may be recomputed from the fragment's version tag and, hence, need not be stored explicitly. Given this annotation schema, the complete lineage of a fragment may be reconstructed, within the limits of the garbage collection strategy.

The methods described herein for versioning atomic units of data make no assumptions about the locality of data. While in some embodiments it may be convenient to maintain the entire version history of a fragment within one node (e.g., with all versions of a fragment situated on the same physical host) there may be no strict requirement to do so. Rather, versions may be distributed across several sites (site being the granularity of replication, e.g., a cluster, etc.). This distribution may be transparent to the query layer. The methods may in some embodiments also be applied to systems employing network partitioning, as described in more detail below.

Figure 10:
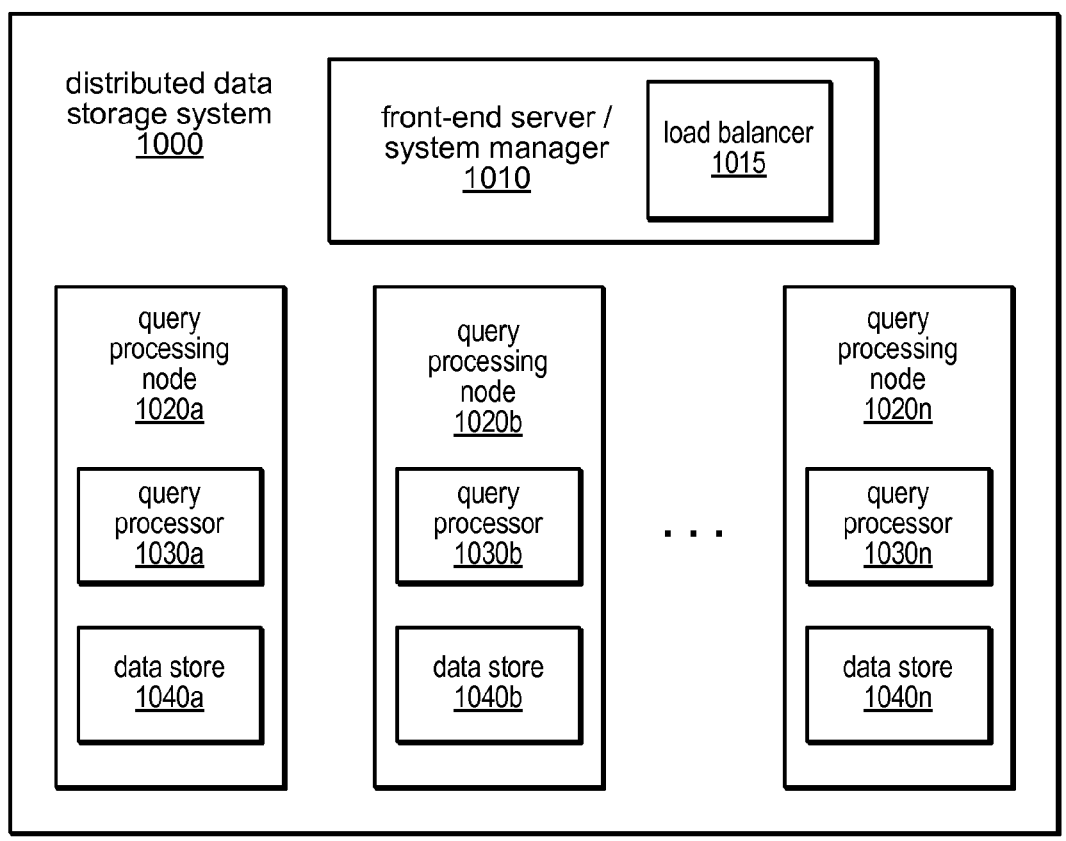
FIG. 10 is a block diagram illustrating a distributed data storage system, according to one embodiment.

The methods described herein for performing versioning of atomic units of data may in some embodiments be applied in an extensible and highly available data processing platform that combines data storage and grid computing capabilities. FIG. 10 illustrates one such system, a distributed data storage system 1000, according to one embodiment. In this example, distributed data storage system 1000 includes a front-end server 1010, which may include a load balancer 1015. The front-end server may in some embodiments be configured to receive user queries and to submit them to various nodes in distributed data system 1000. In some embodiments, the load balancer may be utilized to determine to which nodes each user query should be submitted. The distributed data storage system may also include any number of query processing nodes 1020. While the query processing nodes 1020*a*-1020*n* are illustrated in FIG. 10 as being stand-alone nodes, in other embodiments query processing nodes 1020 may be configured as a clusters of nodes.

In keeping with common design principles of distributed systems, the query processing architecture of distributed data storage system 1000 may be fully symmetric across all nodes, i.e., the same software stack may be deployed on all nodes that host a portion of a distributed data storage system and/or shared services. As illustrated in FIG. 10, each query processing node may include a query processor 1030 and a data store 1040. The query processor may be a modular, self-contained component of this stack with one query processor instance per node. In some embodiments, every query processor instance can accept requests, parse, optimize and execute them. As part of the processing, a query processor instance may delegate sub-requests to other instances on remote nodes.

Query processor 1030 may include a query server process configured to implement functionality in the areas of process management, manageability and supportability. Other processes within query processor 1030 may be configured to receive user queries, translate the user queries into executable query plans, optimize the query plans, instantiate portions of the query plans on one or more other query processing nodes and return query results to the client application via front-end server 1010.

Data store 140 may in some embodiments be configured to maintain atomic units of data (e.g., XML fragments) as part of a distributed database system, and this data may be replicated on one or more other query processing nodes 1020. Data store 1040 may also be configured to store metadata information with (or within) each atomic unit of data stored therein, in some embodiments. In various embodiments, atomic units of data having a given key may all be stored in a same one of data store 1040a, or two or more versions of each atomic unit of data may be stored on different ones of data stores 1040.

As noted above, various front-end tasks such as load-balancing, authorization and/or authentication, or connection management may in some embodiments be performed outside the query processors. Depending on the configuration of the system these front-end tasks may be concentrated on a dedicated subset of host nodes, such as front-end server 1010.

As previously noted, the system described herein may not provide client-visible transactions. Rather, data manipulation may always pertain to a single fragment and may appear to the client to be atomic. In other words, client applications may only be able to modify one item at a time. Atomicity in this context may mean that an individual write operation either completes successfully or fails. In such embodiments, in the case of a failure, no other operations may be rolled back, i.e., previously modified data may not be affected by the outcome of any attempted action later on. More specifically, the system described herein may not support distributed transactions on the application level. This fact, together with the principle of physical data independence (which states clients must not make any assumptions about data locality or storage implementations) implies that the system cannot expose any type of transaction to the client. Without knowledge of data locality, any transaction that affects more than one fragment may inadvertently spawn a distributed transaction. Internally, all data manipulation operations (i.e., modifications of data within the system) may in fact be encapsulated in regular local database transactions, whose scope is limited to an individual node. In systems that do not support transactions, versioning-aware mechanisms may be needed to maintain secondary indexes accordingly.

The versioning mechanisms described herein are strictly orthogonal to the concept of transactions. While versioning may indeed be a mechanism that helps overcome certain concurrency issues in the absence of distributed transactions, versioning may very well be combined with transactions, including distributed transactions, in some embodiments. Hence, transactions may be introduced in the system, for example, as a restricted privilege for system administrators for use in system critical maintenance operations. The versioning approach described herein may support "long running work" (e.g., transactions) that span records. In some embodiments, such a transaction may be modeled as a list of new versions (including index entries) created for the transaction, which may be persistent, or may be transient, in different embodiments.

In one embodiment, when a transaction is started, a transaction identifier may be generated. Every update-object action within that transaction may generate a new version of that object that includes the transaction identifier (and, optionally, a 'transaction-step' sequence number for strict ordering) in its identifier. Multiple updates to the same object may generate the next higher sequence numbers.

A transaction-management object may contain the set of version identifiers of the current point-in-time of the transaction (reads and updates). Again, each operation within the transaction may generate a new version of the transaction-management object (with a new sequence number in its own identifier). The code performing the transaction may own the transaction-management object, and may pass it to other subsystems (or in some embodiments, across services). The originator may receive a new version, containing references to objects updated in those other services. The other services may later learn if the transaction has been committed or aborted. In some embodiments, the transaction identifier may contain the originating-service's transaction identifier to prevent any other service from committing the transaction itself.

In such embodiments, a 'commit' operation may be the final reconciliation of the latest transactional version with a replica's latest mainline version, to produce a new mainline version. After a successful reconciliation, the versions for the intermediate steps may be garbage-collected or archived for audit. In this model, there may exist the possibility of reconciling the same set of changes into multiple destination branches. An 'abort' operation, in this context, may in various embodiments involve the absence of a final merge, the propagation of an 'abort' version of the transaction-management object, and the elimination of any links that may prevent garbage-collection of the intermediate versions. Systems supporting nested transactions may in some embodiments employ sequentially appended transaction identifiers, or more complex version identifiers for an object.

As noted above, the system and methods described herein may be applicable to systems experiencing network partitioning. In such embodiments, the system may provide high availability for partitioned writes by providing explicit, predictable APIs, rather than the less-certain APIs of systems that implement an eventual-consistency model, or another model that ignores the semantics of the data (e.g., a last-writer-wins approach, an approach that performs merges using an arbitrary or pre-determined write order, or an approach that performs a naïve union or intersection of multiple writes). The methods of branching and merging described herein may be leveraged to support partitioning, as described in more detail below.

In order to support write-availability in partitioned networks, the versioning, branching, and merging features described herein may allow applications to choose to create 'offline' branches to continue to write data to the system in the presence of extreme network partitioning. For example, in a conventional system, implicit branching may occur when changes are allowed on both sides of a network partition. The system and methods described herein, however, support explicit branching, rather than implicit branching.

In a partitioned system, a "master" is typically selected or elected on a majority side of a partition and may always accept writes, while writes to a minority partition may not be accepted. In some embodiments, if a write fails because it is directed to a minority partition, an error may be returned indicating that the system is unable to ensure durability. For example, a write may be directed to a minority partition because the majority side is unavailable, or because there is no connected majority partition (e.g., due to excessive partitioning) or no elected master in the majority petition.

In some embodiments, if the client application is not configured to invoke and/or manage explicit branching and merging, the client application may choose to abort or retry the write in response to an indication that the system is unable to ensure durability. In other embodiments, when such an error occurs, the client application may be able to create an explicit offline branch in a minority partition (or even on a single host), using an API, as described above. In such embodiments, the branch may not be guaranteed to be durable even if the system eventually heals (i.e., the hosts with the data may be lost before the data is replicated). However, this branch may be guaranteed to never collide with any other branch (e.g., it may include a branch identifier in its internal name, as well as a name provided by the client). In other words, the system may return an error to a client application indicating that it is partitioned and the client may not update any committed data, but the client application may choose to continue to work, accepting such weaker durability guarantees. In such embodiments, creating an explicit branch may allow the application to create and/or modify data in a place that cannot collide with anything else, and may allow the application to merge the data when the partition has healed.

In some embodiments of a partitioned system, reads and/or writes may always be directed to the master side of a partition unless an explicit branch is created and/or specified. In other words, explicit branching may allow the client application to continue its work, but may prevent the application from being able to assume a partitioned write is a commit. This may be a useful feature in many applications.

In the case of further partitioning, stutter-failure (e.g., in which the system experiences a rapid cycle of partitioning, healing, and re-partitioning), or other partitioning issues, the client may explicitly choose to create a large number of offline branches. In order to merge them, the system may provide a way for clients to detect that offline branches may be merged (i.e., that a partition has healed). The system may also provide a way for clients to enumerate all of the offline branches that they need to merge.

For example, an API may be provided to discover the branches that need to be merged, in some embodiments, and to automatically "retire" them (e.g., delete them or make them inaccessible) after the partition has healed and the branches have been merged back into a main or parent branch.

The methods for handling network partitions described herein may be applied to any number of system configurations and data storage architectures. For example, the distributed data storage system may include a set of clusters that implement a high-availability database, such as Berkeley DB HA, which may use log-shipping, rather than distributed transactions, for high performance, high consistency replication within a single cluster. In such an embodiment, partitions may be allocated to clusters according to any of various allocation schemes.

Conventional garbage collection techniques may not be suitable in the system described herein, in which the "heap" of versions may be scattered among many applications and/or services. In some embodiments, a version leasing service and/or time-to-live approach may be employed to facilitate garbage collection. For example, a centralized version leasing service may maintain time-to-live information on any number of versions of any number of objects. In such embodiments, applications may be able to declare that an object is still live by sending a 'touch' message to the service that would refresh the lease. The service may continuously sweep its own state (e.g., it may only hold version identifiers and time-to-live indicators, not copies of the objects themselves), and may expire versions whose time-to-live has passed. In some embodiments, the system may understand the version hierarchies, and may be able to prune whole trees. Services that wish to garbage-collect their own internal persistent stores, but still retain any versions that were still alive elsewhere within the enterprise, may be able to perform an internal pass first, and then submit the cull-set to the service as a final filter. The service may then return a live/dead decision for each.

As previously noted, in some embodiments an abort operation may result in elimination of any links that may prevent garbage-collection of the intermediate versions. However, in some embodiments, a transaction abort may not explicitly trigger garbage-collection (deletion) of these versions. Rather than treating an abort operation as "forgetfulness" (e.g., with the system forgetting that a write was ever started), the system may not actually forget data that has already been inserted in the distributed data store (e.g., if partial results were inserted without locking them), and that will be visible to client application queries. In some embodiments, intermediate results of an incomplete transaction may be included in the data store and the system may provide a method for excluding these results of incomplete transactions from query results.

In some embodiments, immutable data structures may be implemented in a functional language. To "modify" the data structure and/or its state, each transaction may create an entirely new data structure by copying from the 'root' down to the changed leaves (e.g., copying the whole structure or the elements that are to be modified), and sharing the structure with everything that does not change. In other words, rather than the original data structure being changed, a modified data structure is inserted. In such embodiments, the garbage collector may delete the debris left after a transaction has completed (e.g., after it has been committed). In other embodiments, if a transaction is aborted, the system may be configured to delete all of the versions created by this transaction using the garbage collector or another mechanism.

Figure 11:
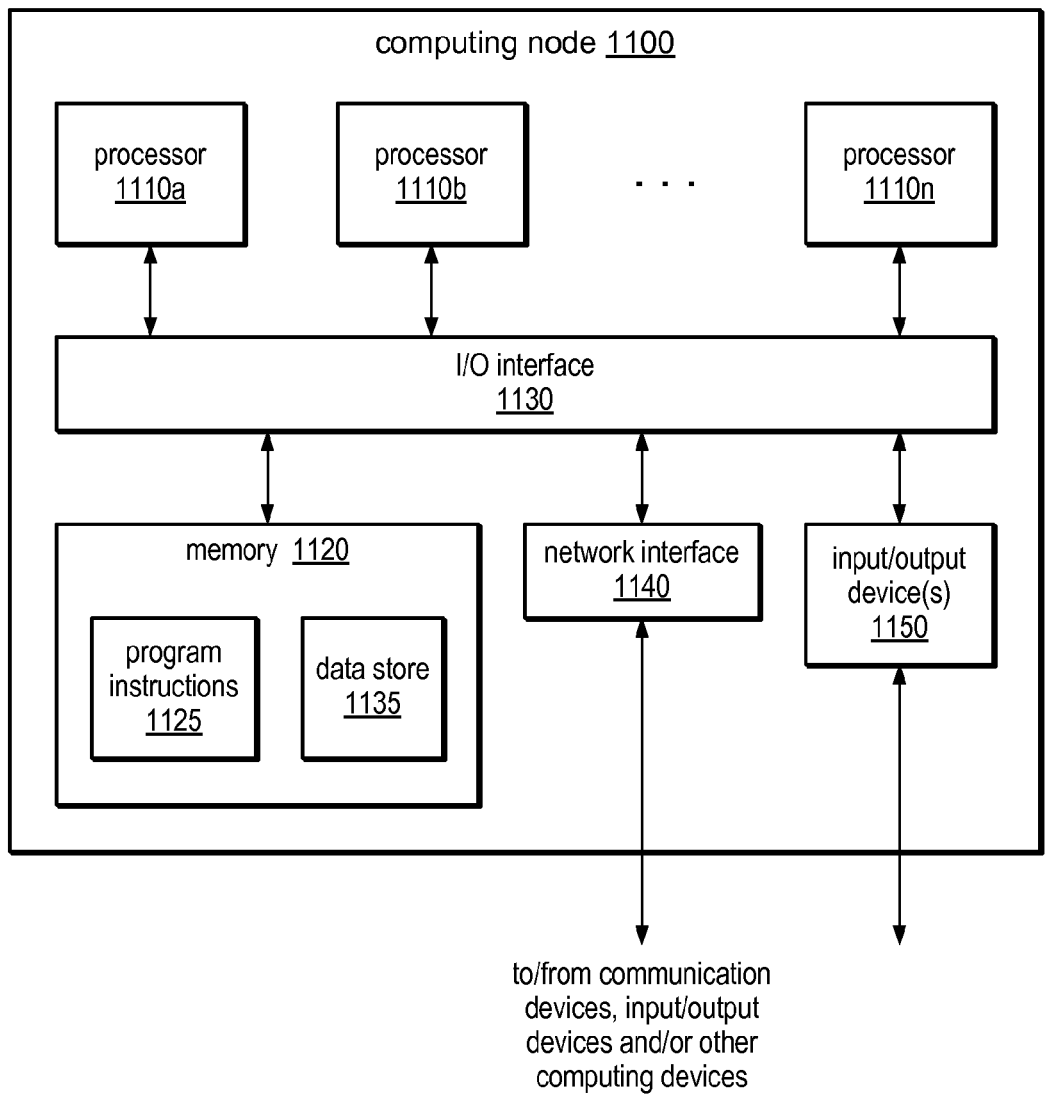
FIG. 11 is a block diagram illustrating one embodiment of a computing node suitable for implementing versioning of atomic units of data.

As previously noted, the methods described herein for performing versioning of atomic units of data (e.g., XML fragments), may be executed by a collection of computing nodes in a distributed data storage system, one or more of which may be configured to implement a front-end server, such as front-end server 1010 of FIG. 10, and others of which may be configured to implement query processing nodes, such query processing nodes 1020 of FIG. 10, according to various embodiments. One such computing node is illustrated in FIG. 11. In the illustrated embodiment, computing node 1100 includes one or more processors 1110 coupled to a system memory 1120 via an input/output (I/O) interface 1130. Computing node 1100 further includes a network interface 1140 coupled to I/O interface 1130, and one or more input/output devices 1150. In some embodiments, a given node may implement the functionality of more than one component of a distributed data storage system. For example, a single node may in some embodiments serve as both a front-end server and a query processing or data storage node. In another example, a single node may host both a client application that may submit query requests and a front-end server and/or query processor that may process query requests. While some of the examples described herein include a grid computing system, the methods described herein may be implemented on any other configurations of server and/or query processing nodes suitable for implementing a distributed data storage system (e.g., a distributed database) across a collection of shared resources.

In various embodiments a computing node 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as that described herein, each of the fleet of nodes may implement the same ISA, or individual nodes and/or clusters of nodes may implement different ISAs.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as program instructions 1125 and data storage 1135, respectively. For example, program instruction 1125 may include any or all of a front-end server process, a user interface, a load-balancing service, a distributed database, a query processor, or a client application. Data storage 1135 may in various embodiments include collections of data (including, for example, XML fragments and/or other atomic units of data) maintained by a distributed database and/or metadata used by the distributed data storage system described herein. In other embodiments, program instructions and/or data may be received, sent or stored upon different types of computer-accessible media or on similar media separate from system memory 1120 or computing node 1100. Generally speaking, a computer-accessible medium may include storage media or memory media such as magnetic or optical media, e.g., disk or CD/DVD-ROM coupled to computing node 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing node 1100 and other devices attached to a network, such as other computer systems, or between other nodes in a shared resource system (e.g., a grid computing system or other distributed data storage system). In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing node 1100 or may be distributed on various nodes of a shared resource system or grid computing system. In some embodiments, similar input/output devices may be separate from computing node 1100 and may interact with one or more nodes of a shared resource system through a wired or wireless connection, such as over network interface 1140.

Users may interact with the distributed data storage system in various ways in different embodiments, such as to submit query requests and receive results. For example, some users may have physical access to computing node 1100, and if so, may interact with various input/output devices 1150 to provide and/or receive information. Alternatively, other users may use client computing systems to access the distributed data storage system, such as remotely via network interface 1140 (e.g., via the Internet and/or the World Wide Web). In addition, some or all of the distributed data storage system components may provide various feedback or other general types of information to users (e.g., in response to user requests) via one or more input/output devices 1150.

Those skilled in the art will appreciate that computing node 1100 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1100 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible storage medium or a portable article to be read by an appropriate drive, various examples of which are described above. In some embodiments, instructions stored on a computer-accessible medium separate from computing node 1100 may be transmitted to computing node 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer system, comprising a plurality of computing nodes;
    wherein each of the plurality of computing nodes comprises one or more processors and a memory storing program instructions;
    wherein when executed on the one or more processors of the plurality of computing nodes, the program instructions cause the plurality of computing nodes to implement a distributed data store configured to:
        store one or more versions of each of a plurality of atomic units of data, wherein each version of each atomic unit of data is associated with a unique version identifier;
        maintain a linear version history of each of the plurality of atomic units of data;
        receive a request from an application executing on a client computing node distinct from the plurality of computing nodes to write a modified version of a given one of the plurality of atomic units of data to the distributed data store as a new version in its version history;
        in response to receiving the request from the application-executing on the client computing node, programmatically determine if the modified version is a direct successor of a latest version of the given atomic unit of data; and
        in response to the same request and in response to said programmatically determining that the modified version is not a direct successor of the latest version of the given atomic unit of data:
            initiate creation of a new version of the given atomic unit of data, wherein creating the new version comprises automatically applying a reconciliation policy that has been specified for the application, wherein content of the new version is dependent on the reconciliation policy specified for the application, and wherein the reconciliation policy specified for the application is a reconciliation policy specified for the application from among a plurality of reconciliation policies supported by the distributed data store, wherein each of the plurality of reconciliation policies is applicable to reconcile concurrent data modifications; and
            store the new version in the distributed data store.

2. The computer system of claim 1, wherein the distributed data store is further configured to, in response to determining that the modified version is a direct successor of the latest version of the given atomic unit of data:
    increment a version identifier associated with the latest version of the given atomic unit of data; and
    store the modified version in the distributed data store as a new version in the version history, wherein the new version is associated with the incremented version identifier.

3. The computer system of claim 1, wherein the distributed data store is further configured to increment a version identifier associated with the latest version of the given atomic unit of data, and wherein the new version is associated with the incremented version identifier.

4. The computer system of claim 1, wherein the reconciliation policy specifies a reconciliation function, and wherein in said initiating creation of a new version of the given atomic unit of data, the distributed data store is configured to execute the reconciliation function as a callback function.

5. The computer system of claim 1,
    wherein the reconciliation policy specifies a last-writer-wins or a highest-priority-writer-wins policy;
    wherein the distributed data store is configured to increment a version identifier associated with the latest version of the given atomic unit of data; and
    wherein the new version is associated with the incremented version identifier.

6. The computer system of claim 1,
    wherein the reconciliation policy specifies an interactive reconciliation policy;
    wherein in said initiating creation of a new version, the distributed data store is configured to return one or more inputs to reconciliation to the application to initiate interactive creation of the new version, wherein the one or more inputs comprise one or more of: a given version of the given one of the plurality of atomic units obtained by the application, the modified version, the latest version, or a version of the atomic unit of data that is a common ancestor of the given version and the latest version.

7. The computer system of claim 1, wherein the distributed data store is configured to:
in response to receiving a query from the application requesting a specified version of a given one of the plurality of atomic units of data, provide the specified version of the given one of the plurality of atomic units of data to the application, wherein the specified version is a version other than the latest version.

8. The computer system of claim 1, wherein each atomic unit of data is associated with a unique data identifier;
wherein the distributed data store is configured to provide an application programming interface comprising a create-merge request;
wherein in response to receiving a create-merge request comprising a specified data identifier from the application, the distributed data store is configured to:
create a new atomic unit of data in the distributed data store associated with the specified data identifier, if no atomic unit of data stored in the distributed data store is associated with the specified data identifier; and
merge a latest version of an atomic unit of data associated with the specified data identifier with a version of the atomic unit of data included in the request, if an atomic unit of data associated with the specified data identifier is stored in the distributed data store.

9. The computer system of claim 1,
wherein the distributed data store is configured to provide an application programming interface comprising an explicit branch request;
wherein in response to receiving an explicit branch request for a specified one of the plurality of atomic units of data from the application, the distributed data store is configured to create a child branch in its version history, wherein the child branch is associated with a unique branch identifier.

10. The computer system of claim 9,
wherein the application programming interface further comprises an integration request;
wherein in response to receiving an integration request from the application specifying the child branch and a given version in the version history, the distributed data store is configured to populate the child branch with the given version.

11. The computer system of claim 10, wherein in response to receiving a request from the application to write a second modified version of the given version to the distributed data store as a new version in the child branch, the distributed data store is configured to:
increment an identifier associated with the given version and store the second modified version in the distributed data store as a new version in the child branch, wherein the new version in the child branch is associated with the incremented version identifier.

12. The computer system of claim 10, wherein in response to receiving an integration request specifying a parent branch and a given version in the child branch, the distributed data store is configured to:
increment a version identifier associated with a latest version in the parent branch;
determine if the given version in the child branch is a direct successor of the latest version in the parent branch;
in response to determining that the given version in the child branch is not a direct successor of the latest version in the parent branch:
initiate creation of a new version in the parent branch dependent on the application-specific reconciliation policy; and
store the new version as a new version in the parent branch; and
in response to determining that the given version in the child branch is a direct successor of the latest version in the parent branch, store the given version in the child branch as a new version in the parent branch;
wherein the new version in the parent branch is associated with the incremented version identifier.

13. The computer system of claim 10, wherein the distributed data store is configured to:
in response to receiving a query from the application requesting a specified version in the child branch, provide the specified version in the child branch to the application, wherein the query comprises the unique branch identifier associated with the child branch.

14. The computer system of claim 1;
wherein one or more of the plurality of nodes comprise a majority side of a network partition and at least one other of the plurality of nodes comprises a minority side of a network partition;
wherein the majority side stores a master copy of each of the versions of the atomic units of data;
wherein in response to receiving on the majority side a write request from the application to write an atomic unit of data, the distributed data store is configured to accept the write request;
wherein in response to receiving on the minority side a request from the application to write an atomic unit of data, the distributed data store is configured to return an indication of an error to the application.

15. The computer system of claim 1,
wherein one or more of the plurality of nodes comprise a majority side of a network partition and at least one other of the plurality of nodes comprises a minority side of a network partition;
wherein the majority side stores a master copy of each of the versions of the atomic units of data;
wherein in response to receiving on the majority side a write request from the application to write an atomic unit of data, the distributed data store is configured to accept the write request;
wherein in response to receiving on the minority side a write request from the application to write an atomic unit of data, the write request comprising an explicit branch request, the distributed data store is configured to create a child branch in the version history of the atomic unit of data on the minority side and to populate the child branch as specified in the write request.

16. A method, comprising:
performing by a computer:
storing one or more versions of each of a plurality of atomic units of data in a distributed database, wherein each version of each atomic unit of data is associated with a unique version identifier;
maintaining a linear version history of each of the plurality of atomic units of data;
receiving a request from an application executing on a client computing node distinct from one or more computing nodes that implement the distributed database to write a modified version of a given one of the plurality of atomic units of data to the distributed database;
in response to receiving the request from the application executing on the client computing node:
programmatically determining whether the modified version is a direct successor of a latest version of the given atomic unit of data;

incrementing a version identifier associated with the latest version of the given atomic unit of data; and in response to the same request and in response to said programmatically determining that the modified version is not a direct successor of the latest version of the given atomic unit of data:

initiating creation of a new version of the given atomic unit of data, wherein creating the new version comprises automatically applying a reconciliation mechanism that has been specified for the application, wherein content of the new version is dependent on the reconciliation mechanism specified for the application, and wherein the reconciliation mechanism specified for the application is a reconciliation mechanism specified for the application from among a plurality of reconciliation mechanisms supported by the distributed database, wherein each of the plurality of reconciliation mechanisms is applicable to reconcile concurrent data modifications; and storing the new version in the distributed database, wherein the new version is associated with the incremented version identifier.

17. The method of claim 16, further comprising:

in response to receiving a request from the application to write a modified version of a second one of the plurality of atomic units of data to the distributed database:

determining whether the modified version of the second atomic unit of data is a direct successor of a latest version of the second atomic unit of data;

incrementing a version identifier associated with the latest version of the second atomic unit of data; and in response to determining that the modified version of the second atomic unit of data is a direct successor of a latest version of the second atomic unit of data, storing the modified version of the second atomic unit of data in the distributed database as a new version of the second atomic unit of data, wherein the new version of the second atomic unit of data is associated with the incremented version identifier of the second atomic unit of data.

18. The method of clam 16, wherein inputs to the reconciliation mechanism comprise one or more of: a given version of the given one of the plurality of atomic units obtained by the application, the modified version, the latest version, or a version of the atomic unit of data that is a common ancestor of the given version and the latest version.

19. The method of claim 16, wherein each atomic unit of data is associated with a unique data identifier, the method further comprising:

in response to receiving an explicit branch request for a specified data identifier from the application, creating a child branch in its version history, wherein the child branch is associated with a unique branch identifier; and in response to receiving an integration request specifying the child branch and a given version of the atomic unit of data from the application, populating the child branch with the given version.

20. The method of claim 19, further comprising, in response to receiving an integration request specifying a parent branch and a given version in the child branch:

determining whether the given version in the child branch is a direct successor of the latest version in the parent branch;

incrementing a version identifier associated with the latest version in the parent branch;

storing a new version in the distributed database as a new version in the parent branch, wherein the new version is dependent on said determining;

wherein the new version in the parent branch is associated with the incremented version identifier.

21. A non-transitory, computer-readable storage medium storing program instructions that when executed on one or more computers cause the one or more computers to implement:

storing one or more versions of each of a plurality of atomic units of data in a distributed data store, wherein each version of each atomic unit of data is associated with a unique version identifier;

maintaining a linear version history of each of the plurality of atomic units of data;

in response to receiving a query from an application executing on a client computing node distinct from one or more computing nodes that implement the distributed data store requesting a specified version of a given one of the plurality of atomic units of data, providing the specified version of the given one of the plurality of atomic units of data to the application;

receiving a request from the application to write a modified version of a given one of the plurality of atomic units of data to the distributed data store as a new version in a parent branch of the version history;

in response to receiving the request from the application executing on the client computing node to write a modified version of a given one of the atomic units of data to the distributed data store as a new version in a parent branch of the version history, programmatically determining if the modified version is a direct successor of a latest version of the given atomic unit of data; and in response to the same request to write the modified version and in response to said programmatically determining that the modified version is not a direct successor of the latest version of the given atomic unit of data:

initiating creation of a new version of the given atomic unit of data, wherein creating the new version comprises automatically applying a reconciliation policy that has been specified for the application, wherein content of the new version is dependent on the reconciliation policy specified for the application, and wherein the reconciliation policy specified for the application is a reconciliation policy specified for the application from among a plurality of reconciliation policies supported by the distributed data store, wherein each of the plurality of reconciliation policies is applicable to reconcile concurrent data modifications; and storing the new version in the distributed data store.

22. The non-transitory, computer-readable storage medium of claim 21, wherein when executed on the one or more computers, the program instructions further cause the one or more computers to implement, in response to determining that the modified version is a direct successor of the latest version of the given atomic unit of data:

incrementing a version identifier of the latest version of the given atomic unit of data; and storing the modified version in the distributed data store as a new version in the parent branch, wherein the new version comprises the incremented version identifier.

23. The non-transitory, computer-readable storage medium of claim 21, wherein the reconciliation policy specifies a reconciliation function, and wherein said initiating creation of a new version of the given atomic unit of data comprises executing the reconciliation function as a callback function.

24. The non-transitory, computer-readable storage medium of claim 21,
   wherein each atomic unit of data comprises a unique data identifier; and
   wherein when executed on the one or more computers, the program instructions further cause the one or more computers to implement:
      in response to receiving an explicit branch request for a specified data identifier from the application, creating a child branch in its version history, wherein the child branch comprises a unique branch identifier; and
      in response to receiving an integration request specifying the child branch and a given version from the application, populating the child branch with the given version.

25. The non-transitory, computer-readable storage medium of claim 24, wherein when executed on the one or more computers, the program instructions further cause the one or more computers to implement, in response to receiving an integration request specifying a parent branch and a given version in the child branch:
   determining if the given version in the child branch is a direct successor of the latest version in the parent branch;
   incrementing a version identifier of the latest version in the parent branch;
   in response to determining that the given version in the child branch is not a direct successor of the latest version in the parent branch:
      initiating creation of a new version in the parent branch dependent on the application-specific reconciliation policy; and
      storing the new version as a new version in the parent branch; and
   in response to determining that the given version in the child branch is a direct successor of the latest version in the parent branch, storing the given version in the child branch as a new version in the parent branch;
   wherein the new version in the parent branch is associated with the incremented version identifier.

* * * * *